United States Patent
Hamada et al.

(10) Patent No.: US 6,672,574 B2
(45) Date of Patent: Jan. 6, 2004

(54) FLUID-FILLED CYLINDRICAL VIBRATION DAMPING DEVICE

(75) Inventors: Masaaki Hamada, Konan (JP); Tatsuya Suzuki, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/273,027

(22) Filed: Oct. 16, 2002

(65) Prior Publication Data

US 2003/0075847 A1 Apr. 24, 2003

(30) Foreign Application Priority Data

Oct. 18, 2001 (JP) .................................. 2001-320233

(51) Int. Cl.[7] .............................. F16M 5/00; F16F 13/00
(52) U.S. Cl. ................................................. 267/140.12
(58) Field of Search ........................ 267/140.11–140.13

(56) References Cited

U.S. PATENT DOCUMENTS

| | | | |
|---|---|---|---|
| 4,749,173 A | 6/1988 | Kanda | |
| 4,768,760 A | 9/1988 | Le Fol | |
| 4,856,764 A | 8/1989 | Kanda | |
| 4,871,151 A | 10/1989 | Kanda | |
| 4,953,833 A | 9/1990 | Schmidt et al. | |
| 5,058,866 A | * 10/1991 | Hamaekers et al. | ... 267/140.11 |
| 5,118,087 A | 6/1992 | Jordens et al. | |
| 5,123,635 A | 6/1992 | Bouhours | |
| 5,190,269 A | * 3/1993 | Ikeda et al. | ............. 267/140.12 |
| 5,310,169 A | 5/1994 | Kojima | |
| 5,397,113 A | 3/1995 | Kojima et al. | |
| 5,427,361 A | 6/1995 | Suzuki et al. | |
| 5,492,310 A | 2/1996 | Bungart et al. | |
| 5,516,083 A | 5/1996 | Sprang et al. | |
| 5,639,073 A | 6/1997 | Suzuki et al. | |
| 5,906,360 A | * 5/1999 | Kanda | ................. 267/140.12 |

FOREIGN PATENT DOCUMENTS

| | | |
|---|---|---|
| DE | 3810309 A1 | 10/1989 |
| DE | 4020713 C2 | 10/1991 |
| DE | 4332367 C2 | 10/1995 |
| DE | 4332480 C2 | 2/1996 |
| JP | 63-3763 | 1/1988 |
| JP | 5-55739 | 8/1993 |
| JP | 8-14311 | 1/1996 |
| JP | 9-21441 | 1/1997 |

\* cited by examiner

Primary Examiner—Christopher P. Schwartz
(74) Attorney, Agent, or Firm—Beyer Weaver & Thomas, LLP

(57) ABSTRACT

Disclosed is a fluid-filled cylindrical vibration damping device including an elastic body interposed between an inner and outer sleeves for elastically connecting these sleeves with each other. A plurality of fluid chambers filled with a non-compressible fluid are partially defined by the elastic body so that a pressure of the fluid in the plurality of fluid chambers vary upon application of a vibrational load to the vibration damping device. A first orifice passage permitting a fluid communication between the fluid chambers is at least partially defined by an elastic member adapted to be subjected to shear deformation due to a fluid pressure acting on the first orifice passage so that a cross sectional area of the first orifice passage increases according to an increase of the pressure of the fluid acting on the first orifice passage owing to the shear deformation of the elastic member.

13 Claims, 14 Drawing Sheets

FLUID-FILLED CYLINDRICAL VIBRATION DAMPING DEVICE

INCORPORATED BY REFERENCE

The disclosure of Japanese Patent Application No. 2001-320233 filed on Oct. 18, 2001 including the specification, drawings and abstract is incorporated herein by reference in its entirety.

BACKGROUND OF THE INVENTION

1. Field of the Invention

The present invention relates generally to a cylindrical vibration damping device including: an inner shaft member; an outer sleeve member disposed radially outward of the inner shaft member; and a rubber elastic body elastically connecting the inner shaft member and the outer sleeve member. More particularly, the present invention is concerned with a fluid-filled cylindrical vibration damping device capable of exhibiting a vibration damping or isolating effect based on flows or resonance of a fluid contained therein, and being suitably employed as an engine mount, a body mount a differential mount, a suspension bushing or other mounts for use in automotive vehicles, for example.

2. Description of the Related Art

A fluid-filled cylindrical vibration damping device is known as one type of a vibration damping mount or bushing interposed between two members of a vibration system for elastically connecting two members or for elastically mounting on one of the two members on the other in a vibration damping or isolating fashion. A known example of the fluid-filled cylindrical vibration damping device is disclosed in JP-B-63-3763 or JP-B-5-55739, which includes an inner shaft member attachable to one of the two members of the vibration system, an outer sleeve member attachable to the other member of the vibration system and disposed radially outwardly of the inner shaft member with a radial spacing therebetween, and a rubber elastic body interposed between the inner shaft member and the outer sleeve member for elastically connecting these two members and defining a plurality of fluid chambers between these two members. These fluid chambers are filled with a non-compressible fluid, and are held in fluid communication with each other through at least one orifice passage. An application of a vibrational load to the fluid-filed vibration damping device constructed as described above induces fluid pressure variation between these fluid chambers, thereby causing flows of the fluid through the orifice passage. Thus, the fluid-filled vibration damping device is able to exhibit an excellent vibration damping effect based on flows or resonance of the fluid flowing through the orifice passage, which effect is never achieved by an elastic mount whose damping effects are only based on the rubber elastic body. For this advantage, the conventional fluid-filled cylindrical vibration damping device is preferably employed as an engine mount for use in an automotive vehicle.

However, the above-described conventional fluid-filled cylindrical vibration damping device exhibits an effective vibration damping or isolating effect based on the fluid flows through the orifice passage, with respect to only input vibrations in a relatively narrow frequency range to which the orifice passage is tuned. In particular, the conventional vibration damping device experiences considerable deterioration in its damping capability when the input vibration has a frequency higher than the frequency to which the orifice passage is tuned.

For the above-described inherent problem, the conventional fluid-filled cylindrical vibration damping device, when being used as an engine mount for an automotive vehicle with its orifice passage is tuned to a frequency range corresponding to engine shakes required to be damped upon driving of the vehicle, or corresponding to engine idling vibrations required to be damped upon idling of the vehicle, is not able to exhibit a desired high damping effect upon application of the engine shakes or a desired vibration isolating effect upon application of the engine idling vibrations for a wide frequency range enough to meet requirements. In particular, the damping capability of the conventional vibration damping device is considerably deteriorated immediately after the input vibration has a frequency higher than the frequency to which the orifice passage is tuned.

Meanwhile, JP-A-9-21441 and JP-A-8-14311 disclose another example of the vibration damping device suitably usable as an engine mount for an automotive vehicle, other than the fluid-filled cylindrical vibration damping device directed to the present invention. The disclosed vibration damping device includes a block-shaped first mounting member, a large-diameter cup-shaped second mounting member and a rubber elastic body interposed between the second mounting member and the first mounting member disposed on the side of an open end portion of the second mounting member for elastically connecting the first and the second mounting members with each other and fluid-tightly closing the open end of the second mounting member, thereby defining a fluid chamber filled with a non-compressible fluid. The disclosed non-cylindrical type fluid-filled vibration damping device has a relatively large inner space in comparison with the fluid-filled cylindrical vibration damping device. For this advantage, the non-cylindrical type fluid-filled vibration damping device, as disclosed in the above-mentioned publications, is able to incorporate therein a switch valve for alternately effecting a plurality of orifice passages tuned to different frequency ranges, or a fluid-pressure absorbing mechanism having a movable plate for limiting an amount of flows of the fluid. This arrangement makes it possible for the non-cylindrical type fluid-filled vibration damping device to easily exhibit a desired vibration damping or isolating effect based on resonance or flows of the fluid through the orifice passage over an expanded or a wide frequency range of vibrations. However, the present invention is directed to the fluid-filled cylindrical vibration damping device wherein the inner shaft member is disposed in the central portion of the bore of the outer sleeve member with a substantially coaxial relationship with each other, making it significantly difficult to incorporate such a complicated mechanism of the orifice passages and the switch valve or such a fluid-pressure absorbing mechanism into the bore of the outer sleeve member of the fluid-filled cylindrical vibration damping device. Further, the use of these mechanisms causes considerable deterioration in efficiency and economy of manufacture of the fluid-filled cylindrical vibration damping device, thus being ineffective to improve the damping capability of the fluid-filled cylindrical vibration damping device.

SUMMARY OF THE INVENTION

It is therefore one object of this invention to provide a fluid-filled cylindrical vibration damping device novel in construction and capable of exhibiting an excellent vibration damping and/or isolating effect based on resonance or flows of the fluid through an orifice passage or passages with respect to vibrations over an expanded or wide frequency range, with simple structure.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled cylindrical vibration damping device including: (a) an inner shaft member; (b) an outer sleeve member disposed radially outwardly of the inner shaft member in a spaced-apart relationship with the inner shaft member; (c) an elastic body interposed between the inner shaft member and the outer sleeve member for elastically connecting the inner shaft member and the outer sleeve member with each other; (d) a plurality of fluid chambers formed between the inner shaft member and the outer sleeve member and filled with a non-compressible fluid so that fluid pressures in the plurality of fluid chambers vary relative to each other upon application of a vibrational load to the vibration damping device; and (e) a first orifice passage permitting a fluid communication between the plurality of fluid chambers and being at least partially defined by an elastic member adapted to be subjected to shear deformation as a result of increase of a fluid pressure acting on the first orifice passage so that a cross sectional area of the first orifice passage increases according to an increase of the fluid pressure acting on the first orifice passage owing to the shear deformation of the elastic member.

In the fluid-filled cylindrical vibration damping device constructed according to this mode of the invention, if a frequency of an input vibration exceeds an initial or static tuning frequency of the first orifice passage (i.e., a frequency range to which the first orifice passage is tuned in a condition where the elastic member is not subjected to shear deformation), a resistance to flows of the fluid through the first orifice passage is considerably increased, and the fluid pressure acting on the first orifice passage is accordingly increased. The elastic member at least partially defining the first orifice passage is elastically deformed due to the increased fluid pressure acting thereon, so as to gradually increase the cross sectional area of the first orifice passage with the increase of the fluid pressure acting on the first orifice passage. This makes it possible to shift the tuning frequency of the first orifice passage to a higher frequency range. That is, the first orifice passage of the fluid-filled cylindrical vibration damping device of this mode of the invention is capable of changing its tuning frequency from the above-indicated initial tuning frequency to a higher frequency range, as if it follows the change of frequencies of input vibrations. If the input vibration has a frequency higher than the initial tuning frequency of the first orifice passage, for example, the tuning frequency of the first orifice passage increases with an increase of the frequency of the input vibration, permitting the fluid-filled cylindrical vibration damping device of this mode of the invention to exhibit an excellent vibration damping effect based on the resonance or flows of the fluid through the first orifice passage, with respect to the input vibrations over a higher frequency range. Thus, the fluid-filled cylindrical vibration damping device of this mode of the invention is capable of exhibiting a desired damping effect based on the resonance or flows of the fluid through the first orifice passage with respect to input vibrations over a wide frequency range, while eliminating the conventionally experienced problem of the considerable deterioration of its vibration damping or isolating capability upon application of the vibrational load whose frequency is higher than the initial tuning frequency of the first orifice passage.

In particular, the first orifice passage is always held in fluid communication with the fluid chambers, and is partially defined by the elastic member that is elastically deformable due to the fluid pressure acting on the first orifice passage. This arrangement permits a gradual and considerable increase of an amount of elastic deformation of the elastic member and a resultant gradual and considerable increase of the cross sectional area of the first orifice passage, according to the increase of the fluid pressure acting on the first orifice passage. This eliminates a problem of abrupt elastic deformation of the elastic member which may occur when the first orifice passage partially defined by a check-like elastic member operable for open-ably checking the first orifice member, and when the pressure of the fluid acting on the first orifice passage reaches a limit value for opening the check-like elastic member, for example. Therefore, when the frequency of the input vibration shifts to a higher frequency range, the fluid-filled cylindrical vibration damping device is able to change the tuning frequency of the first orifice passage so as to substantially correspond to the level of the frequency of the input vibration, thus permitting the fluid-filled cylindrical vibration damping device of this mode of the invention to exhibit an excellent vibration damping or isolating capability over a wide frequency range of the input vibrations.

Since the elastic member at least partially defining the first orifice passage is arranged to be elastically deformed with shear deformation when the fluid pressure acting on the first orifice passage increases, the elastic member can be elastically deformed with high sensitivity with respect to the increase of the fluid pressure acting on the first orifice passage, and with a larger amount of deformation with respect to a given amount of the increase of the fluid pressure acting on the first orifice passage, in comparison with the case where the elastic member is elastically deformed with compression deformation as a primary component. This arrangement allows the first orifice passage to change its tuning frequency so as to follow the change of frequencies of the input vibrations over a sufficiently wide frequency range, with high accuracy. Thus, the fluid-filled cylindrical vibration damping device according to this mode of the invention is capable of exhibiting an excellent vibration damping or isolating capability over the sufficiently wide frequency range of the input vibrations.

(2) A fluid-filled cylindrical vibration damping device according to the above-indicated mode (1), wherein the elastic member comprises an elastic protruding portion, which protrudes into an interior area of the first orifice passage so as to partially narrow the first orifice passage. According to this mode of the invention, the elastic member is formed by the elastic protruding portion whose dimension is made smaller than the entire length of the first orifice passage, making it possible to elastically deform the elastic member with a relatively small fluid pressure acting thereon and with stability. Therefore, the first orifice passage of the fluid-filled cylindrical vibration damping device of this mode of the invention is capable of changing its tuning frequency so as to follow the change of the fluid pressure acting on the first orifice passage caused by the change of the input vibration frequencies, with high sensitivity and accuracy.

(3) A fluid-filled cylindrical vibration damping device according to the above-indicated mode (2), wherein the elastic protruding portion protrudes into the interior area of the first orifice passage with a width dimension over an entire width of the first orifice passage, and includes a narrow groove formed at an intermediate portion in a widthwise direction of a protruding end portion thereof so as to extend in a longitudinal direction of the first orifice passage, the elastic protruding portion being held at a protruding end surface of the protruding end portion thereof at opposite sides of the narrow groove in the widthwise direction with an inner surface of the first orifice passage. In this arrangement, the first orifice passage is narrowed at a portion thereof over the entire width thereof by the elastic protruding portion, so that the fluid pressure can effectively act on the elastic protruding portion. Also, the elastic protruding portion is held in contact at its protruding end portion with the inner surface of the first orifice passage. Therefore, the shapes or states of the narrow groove and the first orifice passage are held in their initial state with high stability, until the fluid pressure applied to the first orifice passage reaches a given limit value, thus making it possible to stabilize an initial vibration damping or isolating capability of the fluid-filled cylindrical vibration damping device based on flows of the fluid through the first orifice passage.

(4) A fluid-filled cylindrical vibration damping device according to the above-indicated mode (2) or (3), wherein the elastic protruding portion is inclined to one of opposite sides in the longitudinal direction of the first orifice passage so that the elastic protruding portion exhibits a soft spring characteristic with respect to the fluid pressure applied thereto from an other one of opposite sides in the longitudinal direction of the first orifice passage. According to this mode of the invention, a void is formed between the elastic protruding portion and the inner wall of the first orifice passage on the one side of the first orifice passage to which the elastic protruding portion is inclined. This allows the elastic protruding portion to be effectively deformed in the direction in which the cross sectional area of the first orifice passage increases, when the fluid pressure applied to the first orifice passage acts on the elastic protruding portion. Since the elastic protruding portion can be elastically deformed with high sensitivity in response to the fluid pressure acting on the first orifice passage, the tuning frequency of the first orifice passage can be changed with high accuracy in response to the frequency of the input vibration. Thus, the fluid-filled cylindrical vibration damping device can exhibit a high vibration damping effect with respect to the input vibrations over a wide frequency range.

(5) A fluid-filled cylindrical vibration damping device according to the above-indicated mode (4), wherein the vibration damping device includes a plurality of the first orifice passages that are arranged in parallel to each other and are respectively provided with the elastic protruding portions inclined to respective directions different from each other. According to this mode of the invention, the plurality of the first orifice passages cooperate to each other to compensate a problem of directions in the elastic deformation of the elastic protruding portions thereof. Namely, this arrangement allows the fluid-filled cylindrical vibration damping device to change the tuning frequency of any one of the first orifice passages thereof and characteristics of a resultant flows of the fluid between the fluid chambers, so as to follow the change of the frequencies of the input vibrations in any directions. Thus, the fluid-filled cylindrical vibration damping device is capable of exhibiting a further improved vibration damping or isolating effect at a desired higher frequency range of the input vibrations.

(6) A fluid-filled cylindrical vibration damping device according to the above-indicated mode (4) or (5), wherein the elastic body includes a groove open in an outer circumferential surface thereof, whose opening is fluid-tightly closed by the outer sleeve member to thereby form the first orifice passage, and the elastic protruding portion is integrally formed with the elastic body such that the elastic protruding portion is formed at at least one of opposite open-end portions of the first orifice passage so as to protrude radially outwardly from a bottom of the groove while being inclined toward an outward of the one of opposite open-end portions of the first orifice passage. This arrangement makes it possible to form the first orifice passage provided with the elastic protruding portion integrally formed with the elastic body with simplicity and ease. In particular, since the elastic protruding portion is formed at at least one of opposite open-end portions of the first orifice passage, the elastic protruding portion can be designed in terms of its inclined angle or the like, with high degree of freedom, and can be formed so as to permit a large amount of elastic deformation thereof.

(7) A fluid-filled cylindrical vibration damping device according to any one of the above-indicated modes (4)–(6), wherein the elastic body includes a groove open in an outer circumferential surface thereof, whose opening is fluid-tightly closed by the outer sleeve member to thereby form the first orifice passage, and the elastic protruding portion is integrally formed with the elastic body such that the elastic protruding portion is formed at a longitudinally intermediate portion of the groove so as to protrude radially outwardly from a bottom of the groove while extending toward one of longitudinally opposite sides of the groove inside the groove. This arrangement makes it possible to form the first orifice passage provided with the elastic protruding portion with simplicity and ease. Also, the elastic protruding portion can be designed in terms of its longitudinal length with high degree of freedom. The first orifice passage should be provided with at least one elastic protruding portion. A plurality of the elastic protruding portions may possible be formed in the first orifice passage, while being independent of each other in the longitudinal direction, depending upon required vibration damping characteristics of the fluid-filled cylindrical vibration damping device. With the help of the provision of the plurality of the elastic protruding portions, the first orifice passage can have a narrowed portion with a relatively large length, while ensuring low spring characteristics of the elastic protruding portions.

(8) A fluid-filled cylindrical vibration damping device according to the above-indicated mode (6) or (7), further comprising an intermediate sleeve member disposed radially outwardly of the inner shaft member in a spaced-apart relationship with the inner shaft member, and elastically connected with the inner shaft member via the elastic body interposed therebetween upon vulcanization of a rubber material for forming the elastic body, while the outer sleeve member is press-fitted onto the intermediate sleeve member, the groove being open in an outer circumferential surface of the intermediate sleeve member. According to this mode of the invention, the first orifice passage is defined by and between the intermediate and the outer sleeve members formed of a metal or other rigid materials, thus ensuring a high dimensional accuracy and shape stability of the first orifice passage. Preferably, a sealing rubber layer may be bonded to the outer circumferential surface of the intermediate sleeve member upon vulcanizing a rubber material, for assuring a fluid-tight sealing between the intermediate and outer sleeve members. More preferably, the sealing rubber layer may be utilized to form the groove open in the outer circumferential surface of the intermediate sleeve member, making it possible to easily form and design the groove with a high degree of freedom. In this case, the sealing rubber layer defining the groove, and the elastic protruding portion are integrally formed with each other, preferably. Yet more preferably, the sealing rubber layer may be integrally formed with the elastic body.

(9) A fluid-filled cylindrical vibration damping device according to any one of the above-indicated modes (1)–(8), further comprising a second orifice passage disposed in a parallel relationship with the first orifice passage, wherein the first and second orifice passages are relatively tuned such that the first orifice passage permits resonance of fluid flowing therethrough at a first frequency range lower than a resonance frequency range of fluid flowing through the second orifice passage when the first orifice passage is in a condition where the elastic member is not subjected to shear deformation, and permits resonance of the fluid flowing therethrough at a second frequency range higher than the resonance frequency range of the fluid flowing through the second orifice passage when the first orifice passage is in a condition where the elastic member is subjected to shear deformation. According to this mode of the invention, the fluid-filled cylindrical vibration damping device is able to exhibit a desired vibration damping or isolating effect based on resonance or flows of the fluid through the second orifice passage, when being subjected to vibrations whose frequencies correspond to a predetermined frequency range to which the second orifice passage is fixedly tuned. When the frequency of input vibration is shifted to a higher frequency range, on the other hand, the tuning frequency of the first orifice passage is shifted to the higher frequency range so as to follow the increase of the frequency of the input vibration, thereby preventing the conventionally experienced considerable deterioration of the vibration damping or isolating characteristics of the fluid-filled cylindrical vibration damping device due to an anti-resonance like effect of the fluid flowing through the second orifice passage. Thus, the fluid-filled cylindrical vibration damping device of this mode of the invention is capable of exhibiting a high vibration damping or isolating effect with respect to vibrations over a wide frequency range. In particular, since the second orifice passage is not partially narrowed, unlike the first orifice passage, thus permitting a sufficient amount of fluid to flow through the second orifice passage, resulting in a further improved vibration isolating or damping effect based on the resonance or flows of the fluid through the second orifice passage.

The present invention according to any one of the above-indicated modes (1)–(9) is preferably applicable to a fluid-filled cylindrical vibration damping device wherein the plurality of fluid chambers held in fluid communication with each other through the first orifice passage, comprise a pressure-receiving chamber partially defined by the elastic body and an equilibrium chamber partially defined by a flexible layer. The pressure of the fluid in the pressure-receiving chamber varies due to the elastic deformation of the elastic body upon application of a vibrational load between the inner shaft member and the outer sleeve member, while the volume of the equilibrium chamber is easily variable. The use of the pressure-receiving chamber and the equilibrium chamber is effective to eliminate or absorb an increase of a static pressure of the fluid of these fluid chambers, e.g., when a static load or weight acts on the vibration damping device in its radial direction perpendicular to its axial direction, like an engine mount. Thus, the fluid-filled cylindrical vibration damping device of this mode of the invention can exhibit a desired vibration damping or isolating effect with high stability.

The present invention according to any one of the above-indicated modes (1)–(9) is also preferably applicable to a fluid-filled cylindrical vibration damping device wherein the plurality of the fluid chambers held in fluid communication with each other through the first orifice passage, may comprise a plurality of pressure-receiving chambers, which are partially defined by the elastic body, and are arranged in respective circumferential portions of the elastic body so as to be opposed to each other with the inner shaft member interposed therebetween in a diametric direction in which a vibrational load primarily applied to the vibration damping device. Upon application of the vibrational load to the fluid-filled cylindrical vibration damping device, pressures of the fluids filling these pressure-receiving chambers vary due to the elastic deformation of the elastic body. This type of fluid-filled cylindrical vibration damping device is preferably usable as a suspension bushing or the like wherein no or a relatively small static load is applied to the vibration damping device, and makes it possible to effectively induce fluid pressure variation between the plurality of pressure-receiving chambers connected to each other via the first orifice passage upon application of the vibration to the vibration damping device.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
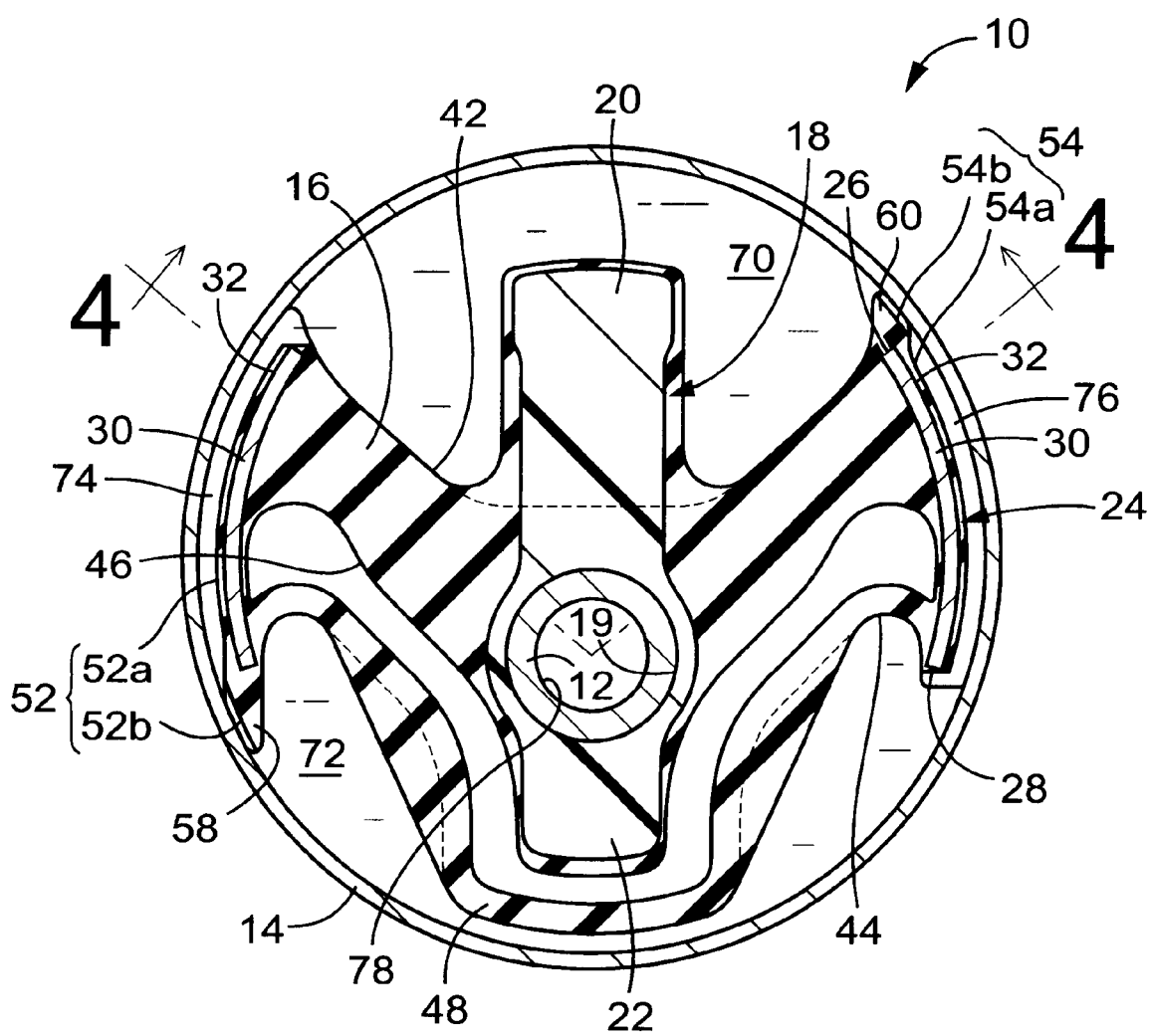
FIG. 1 is an elevational view in transverse cross section of a fluid-filled cylindrical vibration damping device in the form of an engine mount for use in an automotive vehicle, which is constructed according to a first embodiment of the invention.
Figure 2:
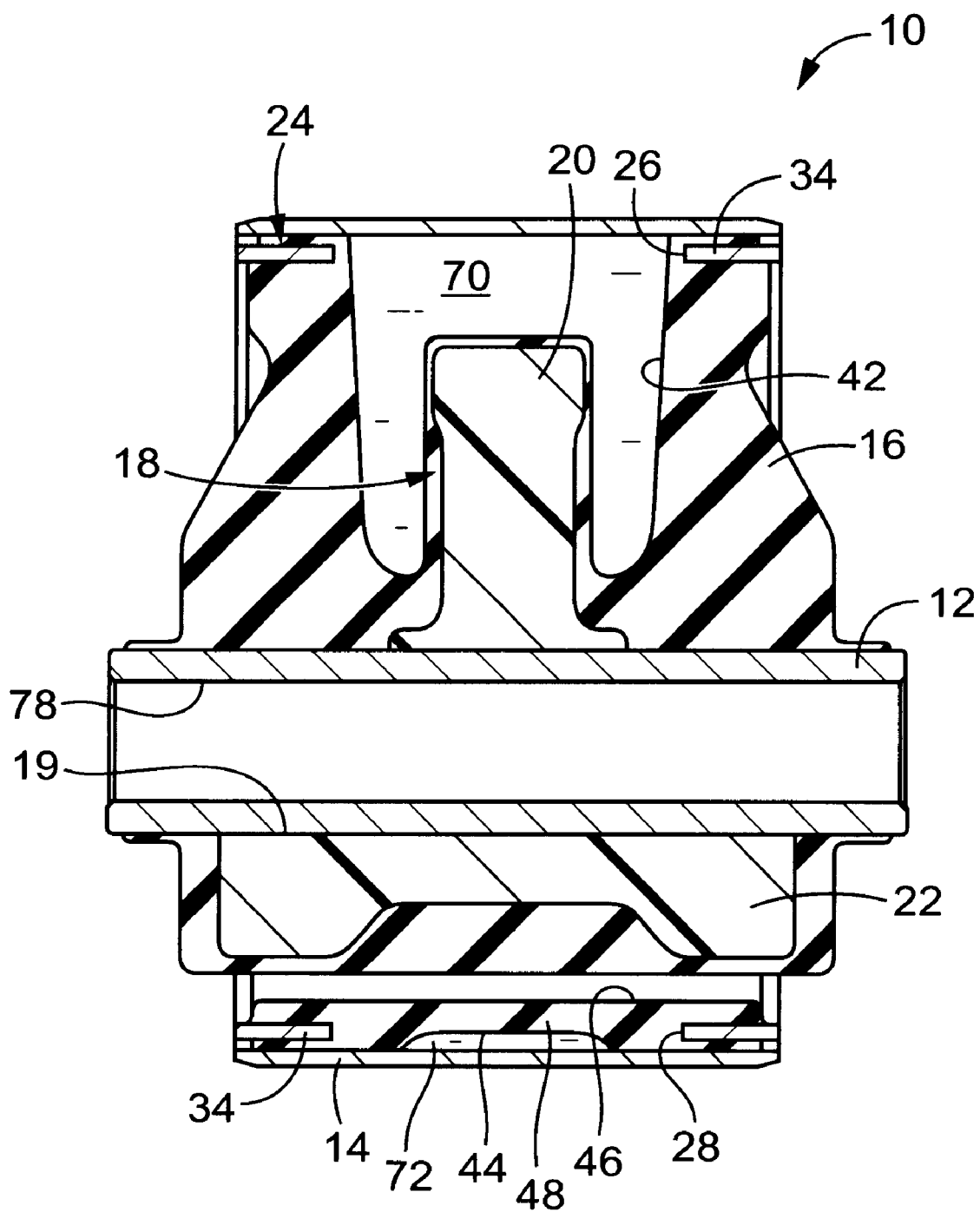
FIG. 2 is an elevational view in axial or vertical cross section of the engine mount of FIG. 1.
Figure 3:
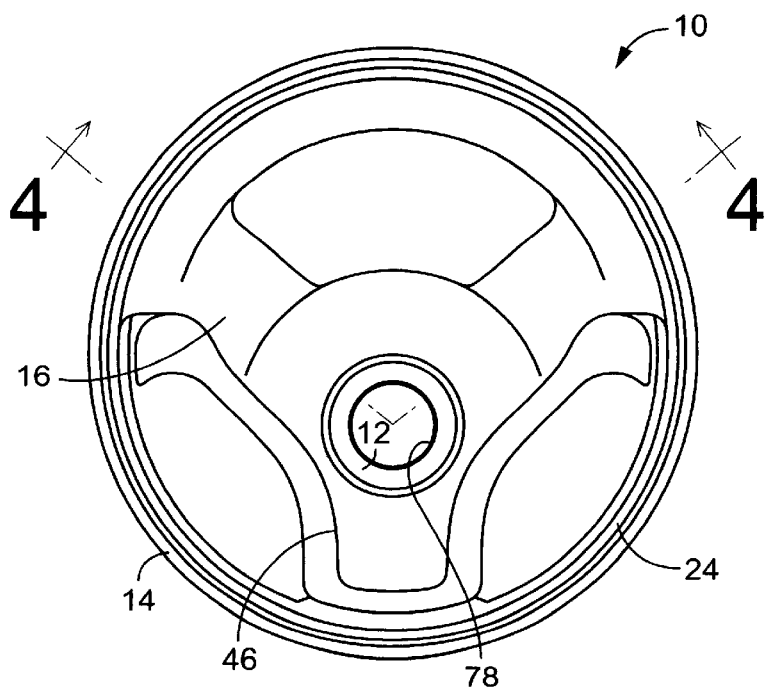
FIG. 3 is a right-side elevational view of the engine mount of FIG. 1.

Referring first to FIGS. 1 and 2, there is shown a fluid-filled cylindrical vibration damping device in the form of an engine mount 10, which is constructed according to a first embodiment of the present invention, for use in a front-engine front-drive motor vehicle (FF vehicle). This engine mount 10 includes an inner shaft member in the form of an inner sleeve 12 and an outer sleeve member in the form of an outer sleeve 14, which are made of metal and disposed such that the two sleeves 12, 14 are spaced apart from each other in a radial or diametrical direction of the engine mount 10. The inner sleeve 12 has an axis or center that is radially offset from an axis or center of the outer sleeve 14 by a given radial distance. The inner and outer sleeves 12, 14 are elastically connected with each other by an elastic body 16 made of rubber interposed therebetween. One of the inner and outer sleeves 12, 14 is attachable to a body of the vehicle (not shown) and the other is attachable to a power unit (not shown) for supporting the power unit on the vehicle body via the engine mount 10 in a vibration damping or isolating fashion. When the engine mount 10 is installed on the vehicle as described above, a static load or weight of the power unit acts on the elastic body 16 in the generally vertical direction as seen in FIGS. 1 and 2, and the elastic body 16 is elastically deformed so that the inner and outer sleeves 12, 14 are placed in a substantially coaxial or concentric relation with each other. With the engine mount 10 installed on the vehicle as described above, the engine mount 10 receives a vibrational load primarily in the vertical direction in which the weight of the power unit acts on the elastic body 16. This direction will be referred to as "a vibrational load-receiving direction" where appropriate.

Described more specifically, the inner sleeve 12 is a thick-walled hollow cylindrical member, and is assembled with a longitudinal stopper member 18 formed of a rigid material such as a fiber reinforced plastics and metal, and disposed radially outward thereof. This stopper member 18 has a fixing bore 19 formed through its generally central portion, at which the stopper member 18 is disposed radially outwardly on and fixed to an outer circumferential surface of the inner sleeve 12 at an approximately axially central portion of the inner sleeve 12. With the stopper member 18 assembled with the inner sleeve 12 as described above, the stopper member 18 protrudes outwardly from the outer circumferential surface of the inner sleeve 12 in opposite directions in one diametric direction of the inner sleeve 12 in order to provide a bound stopper 20 and a rebound stopper 22, which are integrally formed with each other. In the present embodiment, the bound stopper 20 has a pillar shape with a lengthwise dimension smaller than that of the rebound stopper 22. Meanwhile, the stopper member 18 constructed as described above may be formed and assembled with the inner sleeve 12, simultaneously, by injecting and curing a synthetic resin material into a mold for forming the stopper member 18 in which the inner sleeve 12 is set.

An intermediate sleeve 24 made of metal is disposed radially outwardly of the inner sleeve 12 with a radial spacing therebetween so as to surround the inner sleeve 12, while being radially offset from the inner sleeve 12 by a slight radial distance. The intermediate sleeve 24 is a cylindrical member having a relatively large diameter and a relatively small wall thickness. The intermediate sleeve 24 has a first window 26 and a second window 28 formed through diametrically opposite circumferential portions thereof with a generally rectangular shape. These first and second windows 26, 28 are located in an axially intermediate portion of the intermediate sleeve 24, and extend in the circumferential direction of the intermediate sleeve 24 with a circumference that is smaller than a half of the circumference of the intermediate sleeve 24. The first window 26 is circumferentially opposite to the second window 28 via a pair of connecting parts 30, 30 at its both circumferential ends, and vice versa. The connecting parts 30, 30 have small diameter portions at their axially central portions for providing circumferential grooves 32, 32, respectively, each having a relatively large widthwise dimension and extending between circumferentially opposite edges of the first and second windows 26, 28. In other words, the intermediate sleeve 24 includes a pair of ring portions 34, 34 disposed coaxially with and axially spaced away from each other, and the connecting parts 30, 30 integrally connecting the pair of ring portions 34, 34 with each other.

Figure 5:
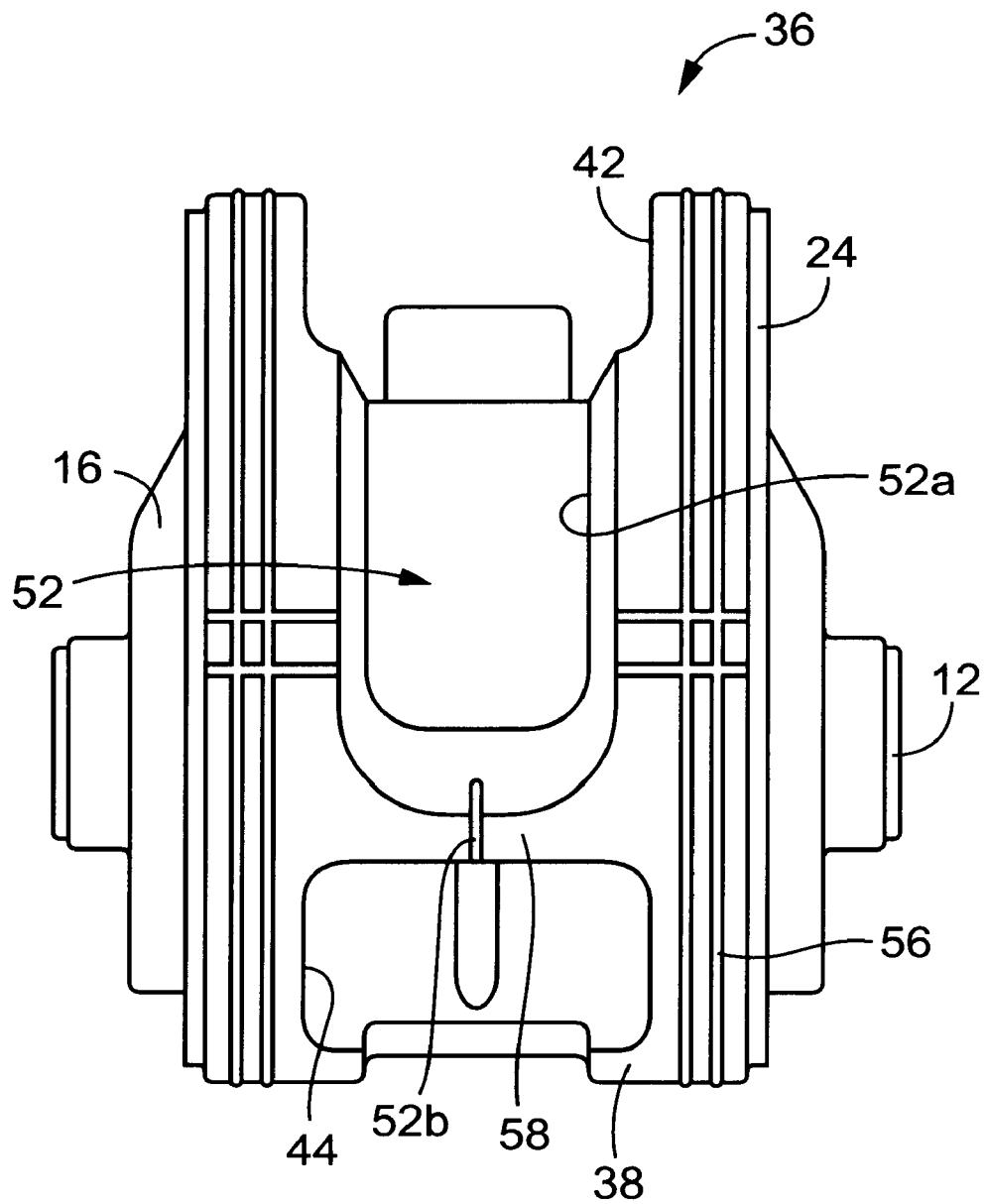
FIG. 5 is a left-side elevational view of an integrally vulcanized assembly of the engine mount of FIG. 1.
Figure 6:
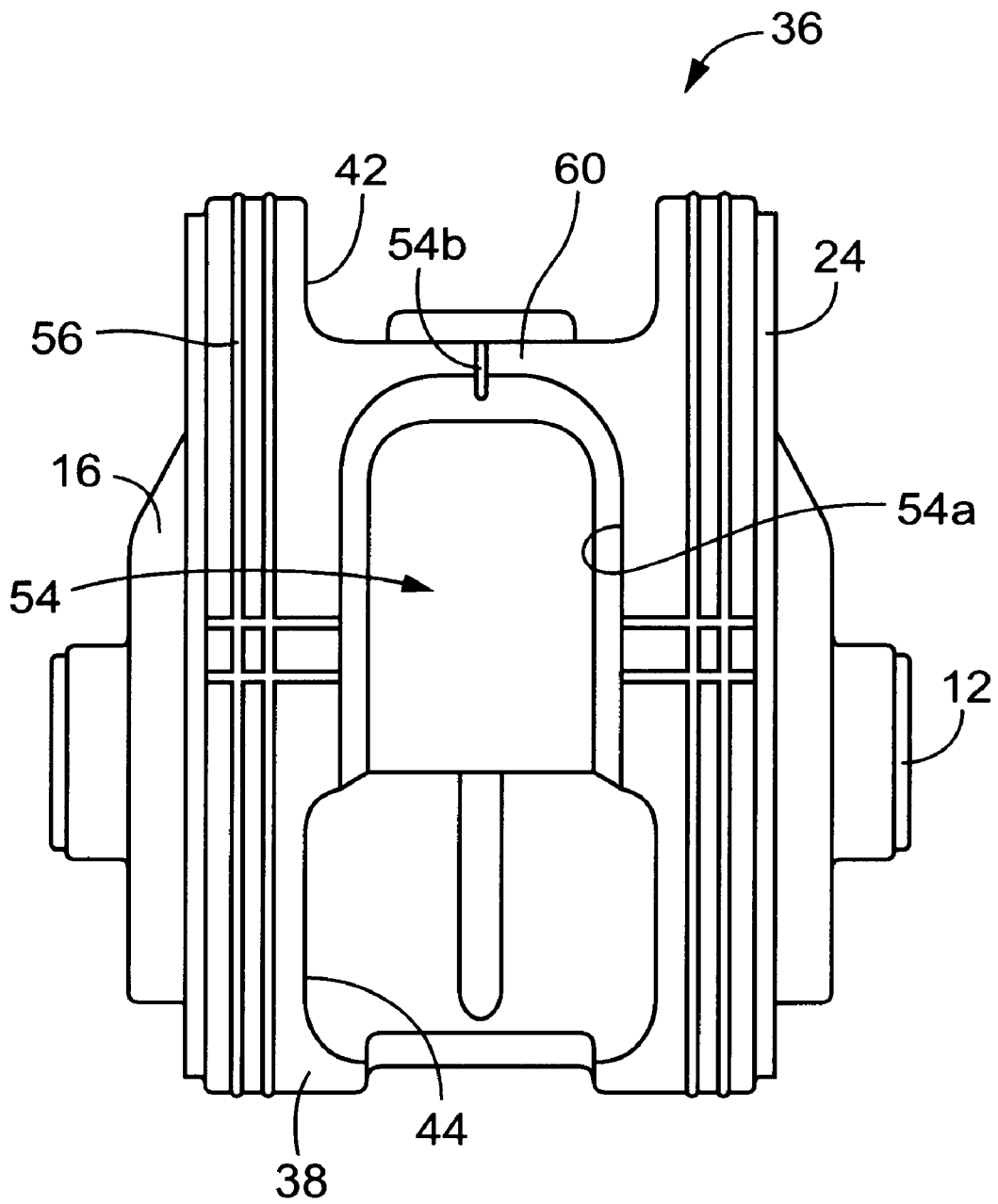
FIG. 6 is a right-side elevational view of the integrally vulcanized assembly of the engine mount of FIG. 1.

The elastic body 16 is interposed between the inner sleeve 12 and the intermediate sleeve 24. The elastic body 16 has a thick-walled cylindrical shape in its entirety, and is bonded at its inner and outer circumferential surfaces to the inner and intermediate sleeves 12, 24, respectively, during vulcanization of a rubber material for forming the elastic body 16, thus providing an integrally vulcanized assembly 36 consisting of the elastic body 16 and the inner and intermediate sleeves 12, 24, as shown in FIGS. 5 and 6. A sealing rubber layer 38 is formed and bonded on a substantially entire area of an outer circumferential surface of the intermediate sleeve 24 during vulcanization of a rubber material for forming the sealing rubber layer 38. The thickness of the sealing rubber layer 38 is made large at the circumferential grooves 32, 32 of the pair of connecting portions 30, 30 of the intermediate sleeve 24 in order to fill the circumferential grooves 32, 32 with the sealing rubber layer 38. The sealing rubber layer 38 and the elastic body 16 may be integrally formed with each other.

The elastic body 16 has a first pocket 42 and a second pocket 44 open in its outer circumferential surface. These first and second pockets 42, 44 are opposed to each other in the vertical direction as seen in FIG. 1 in which the inner and the intermediate sleeves 12, 24 are offset from each other. The first pocket 42 is formed on one side of the inner sleeve 12 where the radial distance between the inner and intermediate sleeves 12, 24 is larger, i.e., the upper side of the inner sleeve 12 as seen in FIG. 1, while the second pocket 44 is formed on the other side of the inner sleeve 12 where the radial distance between the two sleeves 12, 24 is smaller, i.e., the lower side of the inner sleeve 12 as seen in FIG. 1. The first and second pockets 42, 44 are open in the outer circumferential surface of the intermediate sleeve 24 through the first and second windows 26, 28 of the intermediate sleeve 24, respectively.

Within the first pocket 42, the bound stopper 20 is disposed so as to protrude radially outwardly from the center of the bottom portion of the first pocket 42. The bound stopper 20 is substantially entirely coated by a rubber buffer layer, which is integrally formed with the elastic body 16 and bonded to the substantially entire outer surface of the bound stopper 20 during vulcanization of a rubber material for forming the rubber buffer layer.

The second pocket 44 has a bottom wall 48 formed of the elastic body 16, which functions as a flexible layer. In order to reduce the thickness of the bottom wall 48 of the second pocket 44, the elastic body 16 has an axial void 46 formed through the entire axial length thereof substantially entirely along the bottom wall 48 of the second pocket 44. In the presence of the axial void 46, the bottom wall 48 of the second pocket 44 is made easy to be deformed. Within the axial void 46, the rebound stopper 22 is disposed so as to protrude radially outwardly from the center of the bottom portion of the axial void 46, i.e., from the inner sleeve 12. Like the bound stopper 20, the rebound stopper 22 is substantially entirely coated by a covering rubber layer, which is integrally formed with the elastic body 16 and bonded to the substantially entire outer surface of the rebound stopper 22 during vulcanization of a rubber material for forming the covering rubber layer. The diameter of the rebound stopper 22 is made large at its axially opposite end portions so as to protrude radially outward of its intermediate portion. The axially opposite end portions of the rebound stopper 22 are opposed to the pair of ring portions 34, 34 of the intermediate sleeve 24 with a given spacing including the axial void 46 interposed therebetween.

Further, two first grooves 52, 54 are formed in the thick parts of the sealing rubber layer 38 filling the grooves 32, 32 of the connecting parts 30, 30 of the intermediate sleeve 24 The grooves 52, 54 extends circumferentially between the openings of the first and second pockets 42, 44 so that the openings of the first and second pockets 42, 44 are held in communication through the grooves 52, 54. Meanwhile, the openings of the first and second pockets 42, 44 are respectively surrounded by a plurality of sealing lips 56 formed on the outer circumferential surface of the sealing rubber layer 38, each extending axially or circumferentially.

Figure 4:
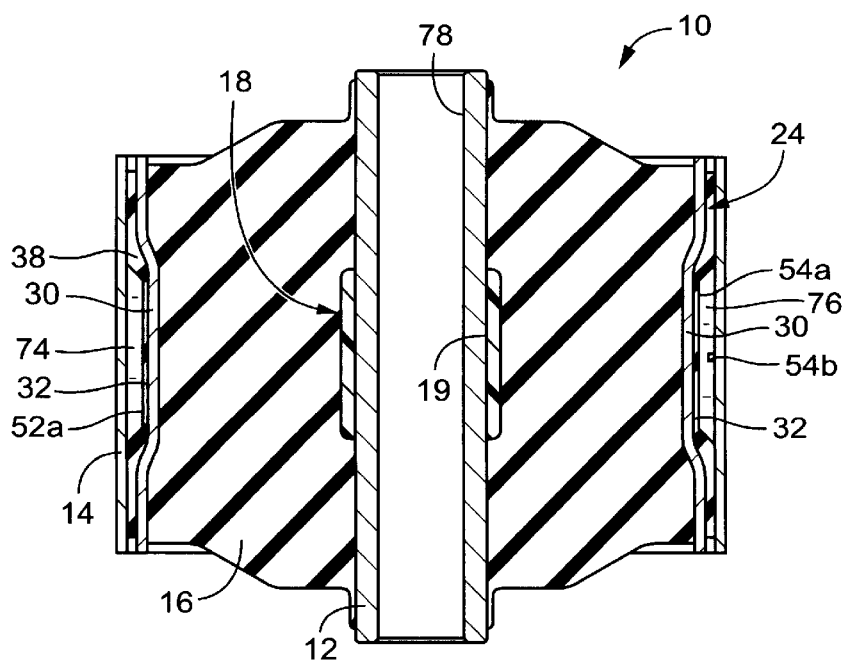
FIG. 4 is a cross sectional view taken along line 4—4 of FIG. 3.

As is apparent from FIGS. 1, 4 and 5, the first groove 52 includes a large width groove 52a and a small width groove 52b as a narrow groove. The large width groove 52a straightly extends circumferentially from one of circumferentially opposite edges of the first pocket 42 to a portion close to the corresponding edge of the second pocket 44, with a widthwise dimension close to the entire widthwise dimension of the circumferential groove 32 of the intermediate sleeve 24. A part of the sealing rubber layer 38, which is interposed between the large width groove 52a and the edge of the second pocket 44, protrudes radially outwardly with a given axial width, for thereby providing an elastic member, e.g., an elastic protruding portion in the form of an elastic partition wall 58. Namely, the large width groove 52a and the edges of the second pocket 44 may be separated from each other with the elastic partition wall 58 formed of the sealing rubber layer 38 in between. As is clearly shown in FIG. 1, the elastic partition wall 58 is formed on one of circumferentially opposite ends of the connecting part 30 of the intermediate sleeve 24 (i.e., the lower end as seen in FIG. 1) so as to protrude radially outwardly from the bottom of the first groove 52 while being inclined to one of circumferentially opposite sides (i.e., the lower side as seen in FIG. 1) of the first groove 52. In other words, the elastic partition wall 58 protrudes circumferentially outwardly from the lower end of the connecting part 30 into the second pocket 44 while being inclined radially outwardly. The protruding end portion of the elastic partition wall 58 is located in the second pocket 44 without being bonded or supported at its radially inner portion to and by the connecting part 30 of the intermediate sleeve 24. Therefore, the protruding end portion of the elastic partition wall 58 is elastically displaceable or deformable toward radially inwardly while exhibiting relatively flexible spring characteristics thereof.

As is apparent from FIGS. 1, 4 and 6, the other first groove 54 includes a large width groove 54a and a small width groove 54b as a narrow groove. Unlike the above-described first groove 52, the large width groove 54a straightly extends circumferentially from one of circumferentially opposite edges of the second pocket 44 to a portion close to the corresponding edge of the first pocket 42, with a widthwise dimension close to the entire widthwise dimension of the circumferential groove 32 of the intermediate sleeve 24. A part of the sealing rubber layer 38, which is interposed between the large width groove 54a and the edge of the first pocket 42, protrudes radially outwardly with a given axial length, for thereby providing an elastic member, e.g., an elastic protruding portion in the form of an elastic partition wall 60. Namely, the large width groove 54a and the edges of the first pocket 42 may be separated from each other with the elastic partition wall 60 formed of the sealing rubber layer 38 in between. As is clearly shown in FIG. 1, the elastic partition wall 60 is formed on one of circumferentially opposite ends of the connecting part 30 of the intermediate sleeve 24 (i.e., the upper end as seen in FIG. 1) so as to protrude radially outwardly from the bottom of the first groove 54 while being inclined to one of circumferentially opposite sides (i.e., the upper side as seen in FIG. 1) of the first groove 54. In other words, the elastic partition wall 60 protrudes circumferentially outwardly from the upper end of the connecting part 30 into the first pocket 42 while being inclined radially outwardly. The protruding end portion of the elastic partition wall 60 is located in the first pocket 42 without being bonded or supported at its radially inner portion to and by the connecting part 30 of the intermediate sleeve 24. Therefore, the protruding end portion of the elastic partition wall 60 is elastically displaceable or deformable toward radially inwardly while exhibiting relatively flexible spring characteristics thereof, as well.

The small width grooves 52b, 54b are formed and extending straightly circumferentially at central portions in the widthwise direction of the respective protruding end surfaces of the elastic partition walls 58, 60 of the respective first grooves 52, 54. The small width groove 52b is connected in series with the large width groove 52a, and cooperates with the large width groove 52a to form the first groove 52. Likewise, the small width groove 54b is connected in series with the large width groove 54a, and cooperates with the large width groove 54a to form the first groove 54. These small width grooves 52b, 54b are arranged to have a widthwise and a depth dimension that are made sufficiently smaller than those of the large width grooves 52a, 54a. In the present embodiment, particularly, the small width grooves 52b, 54b have a cross sectional area that are not larger than a half of the cross sectional area of the large width grooves 52a, 54a.

As shown in FIGS. 1–4, the outer sleeve 14 is disposed radially outwardly on the integrally vulcanized assembly 36 constructed as described above, and is radially inwardly drawn onto the metallic sleeve 24 of the integrally vulcanized assembly 36, thereby being forcedly fitted onto the metallic sleeve 24. With the outer sleeve 14 is firmly assembled with the integrally vulcanized assembly 36 as described above, the openings of the first pocket 42, the second pocket 44, and the two first grooves 52, 54 are fluid-tightly closed by the outer sleeve 14, thereby providing a fluid chamber in the form of a pressure-receiving chamber 70 partially defined by the elastic body 16, a fluid chamber in the form of an equilibrium chamber 72 partially defined by the flexible bottom wall 48, which chambers 70, 72 are filled with a suitable non-compressible fluid, and two of first orifice passages 74, 76 permitting a fluid communication between the pressure-receiving chamber 70 and the equilibrium chamber 72. The fluid pressure in the pressure-receiving chamber 70 varies due to the elastic deformation of the elastic body 16 upon application a vibrational load between the inner and outer sleeves 12, 14, and the volume of the equilibrium chamber 72 is easily variable based on deformation of the bottom wall 48.

In a state where the integrally vulcanized assembly 36 is forcedly assembled with the outer sleeve 14 as described above, the elastic partition walls 58, 60 formed in the first orifice passage 74, 76 are both held in substantially close contact with the outer sleeve 14 at their protruding end surfaces. The openings of the small width grooves 52b, 54b open in the protruding end surfaces of the elastic partition walls 58, 60, respectively, are closed by the outer sleeve 14, thereby the first orifice passages 74, 76 are partially restricted or narrowed by the elastic partition walls 58, 60.

The pressure-receiving chamber 70, the equilibrium chamber 72 and the first orifice passages 74, 76 are filled with the suitable non-compressible fluid, preferably water, alkylene glycol, polyalkylene glycol and silicone oil. The engine mount 10 constructed according to the present invention includes the pressure-receiving chamber 70 and the equilibrium chamber 72 which are held in fluid communication with each other via the first orifice passages 74, 76. The viscosity of the fluid filling the pressure receiving and equilibrium chambers 70, 72 is not particularly limited, but may be desirably determined taking into account required damping characteristics or the like. It is desirable that the fluid have a relatively low viscosity, preferably, not higher than 0.1 Pa·s. The filling of the pressure-receiving and equilibrium chambers 70, 72 with the non-compressible fluid may be accomplished by assembling the outer sleeve 14 with the integrally vulcanized assembly 36 within a mass of the fluid.

The engine mount 10 constructed as described above is installed on the vehicle such that the inner sleeve 12 is fixed to one of the body and the power unit of the vehicle (not shown) by means of a mounting rod or bolt extending through a bore 78 of the inner sleeve 12, while the outer sleeve 14 is fixed to the other by being forcedly pressed into a mounting bore formed in the other of the body and the power unit. Thus, the engine mount 10 is disposed between the power unit and the body of the vehicle for elastically mounting the power unit on the body in a vibration damping or isolating fashion. When the present engine mount 10 is installed on the vehicle as described above, a static load or weight of the power unit acts on the engine mount 10, whereby the elastic body 16 is elastically deformed so that the inner and outer sleeves 12, 14 are placed in a substantially coaxial or concentric relation with each other. In order to permit a displacement of the inner and outer sleeves 12, 14 in the vertical direction as seen in FIG. 1, in which the inner and outer sleeves 12, 14 are offset from each other and vibrational loads are primary applied, a given gap or clearance is formed between the protruding end portion of the bound stopper 20 and a portion of the outer sleeve 14 opposed to the protruding end portion of the bound stopper 20 in the vertical direction.

When a vibrational load is applied to the engine mount 10 constructed as described above, a pressure of the fluid in the pressure-receiving chamber 70 varies due to the elastic deformation of the elastic body 16, thus causing a fluid pressure difference between the pressure-receiving chamber 70 and the equilibrium chamber 72. As a result, the fluid filling the pressure-receiving chamber 70 and the equilibrium chamber 72 is forced to flow through the first orifice passages 74, 76 between these two chambers 70 and 72. In the frequency range to which the first orifice passages 74, 76 are tuned, the engine mount 10 is able to exhibit an excellent damping effect based on resonance or flows of the fluid through the first orifice passages 74, 76. The first orifice passages 74, 76 may be suitably tuned by adjusting their large and small width grooves 52a, 52b and their large and small width grooves 54a, 54b in terms their lengths and cross sectional areas. For instance, a ratio, A/L of cross sectional area "A" to length "L" of each of the first orifice passages 74, 76 is made larger so that the engine mount 10 can exhibit a high vibration isolating effect based on resonance or flows of the fluid through the first orifice passages 74, 76 with respect to high frequency vibrations.

When the engine mount 10 is subjected to a vibrational load having a frequency higher than the frequency range to which the first orifice passages 74, 76 are tuned, a difference (phase difference) between the phase of the vibrational load applied between the inner and outer sleeves 12, 14 and the phase of fluid pressure variation between the pressure-receiving chamber 70 and the equilibrium chamber 72 based on fluid flows through the first orifice passages 74, 76 is changed, so that a resistance to flow of the fluid through each of the first orifice passages 74, 76 is significantly increased due to anti-resonance-like effect based on the above-described change of the phase difference. This significant increase of the resistance to flow of the fluid through each of the first orifice passages 74, 76 causes a significantly high positive fluid pressure or a significantly high negative fluid pressure in the pressure-receiving chamber 70. These high positive or negative fluid pressure generated in the pressure-receiving chamber 70 is accordingly applied to the first orifice passages 74, 76, and then finally reaches to the elastic partition walls 58, 60 defining the small width grooves 52b, 54b, through the large width grooves 52a, 54a, respectively.

Since these elastic partition walls 58, 60 protrude outwardly from the first orifice passages 74, 76 into the equilibrium chamber 72 and the pressure-receiving chamber 70 as described above, these elastic partition walls 58, 60 can be comparatively easily deformed to be extended into the equilibrium chamber 72 and the pressure-receiving chamber 70, due to the significantly high positive and negative fluid pressure applied thereto through the large width grooves 52a, 54a. In this respect, the elastic partition walls 58, 60 are elastically deformed into the equilibrium chamber 72 and the pressure-receiving chamber 70 in the radially inward direction without being restricted by the intermediate sleeve 24, thereby being subjected to shear deformation. Therefore, the elastic partition walls 58, 60 can exhibit a relatively small spring characteristics, and can be elastically deformed over a relatively wide area with a generally constant spring constant.

In addition, the small-width grooves 52b, 54b formed in the elastic partition walls 58, 56 are always held in fluid communication with the equilibrium chamber 72 and the pressure-receiving chamber 70, respectively, so that somewhat amount of fluid flows through the small-width grooves 52b, 54b are always permitted. This is effective to moderate an abrupt fluid pressure change induced in the pressure-receiving chamber 70 and an abrupt fluid pressure change applied to the elastic partition walls 58, 60, thereby avoiding abrupt elastic deformation of the elastic partition walls 58, 60 that would cause abrupt flows of the fluid like torrents. This arrangement ensures that amounts of elastic deformation of the elastic partition walls 58, 60 increase by an amount corresponding to an increment of the positive or negative pressure of the fluid generated in the pressure-receiving chamber 70 upon application of a vibrational load having a frequency higher than the tuning frequency of the first orifice passages 74, 76 to the engine mount 10.

Namely, a relatively large fluid pressure is applied to the elastic partition walls 58, 60 when a frequency of the input vibration exceeds the tuning frequency of the first orifice passages 74, 76, so that the elastic partition walls 58, 60 are elastically deformed with a shear component, and consequently are spaced away from the outer sleeve 14. Accordingly, the cross sectional areas of the small width grooves 52b, 54b formed by and between the elastic partition walls 58, 60 and the outer sleeve 14 are made larger, so that the tuning frequency of the first orifice passages 74, 76 is shifted to higher frequency range, as a result of the increase of the cross sectional areas "A" of the first orifice passages 74, 76. A more larger fluid pressure is applied to the elastic partition walls 58, 60 when the frequency of the input vibration further increases, resulting in more larger elastic deformation of the elastic partition walls 58, 60. This leads to further increase in the cross sectional areas of the first orifice passages 74, 76, whereby the tuning frequency of the first orifice passage 74, 76 is shifted further to the higher frequency range so as to follow the increase of the frequency of the input vibration.

In the engine mount 10 constructed according to the present invention, the amounts of elastic deformation of the elastic partition walls 58, 60 vary according to the frequency of the input vibration so that the tuning frequency of the first orifice passages 74, 76 is shifted or changed according to the frequency of the input vibration. This arrangement makes it possible to eliminate or reduce the conventional problem of deterioration of the damping capability of the engine mount 10 due to a considerable increase of the resistance to flows of the fluid through the first orifice passages 74, 76 when the frequency of the input vibration exceeds initial tuning frequency of the first orifice passages 74, 76, which are measured when the elastic partition walls 58, 60 are not subjected to any deformation. Thus, the engine mount 10 of the present embodiment can exhibit an excellent vibration damping or isolating effect with respect to input vibrations over a wide frequency range based on resonance or flows of the fluid through the first orifice passages 74, 76.

Moreover, the elastic partition wall 58 formed in the first orifice passage 74 is arranged to protrude into the equilibrium chamber 72 with a given gradient, thus facilitating the elastic deformation of the elastic partition wall 58 upon application of the relatively large fluid pressure in the pressure-receiving chamber 70 thereto through the first orifice passage 74. On the other hand, the elastic partition wall 60 formed in the first orifice passage 76 is arranged to protrude into the pressure-receiving chamber 70 with a given gradient, thus facilitating the elastic deformation of the elastic partition wall 60 upon application of the relatively large fluid pressure in the equilibrium chamber 72 thereto through the first orifice passage 76. That is, the pair of the first orifice passages 74, 76 cooperate to permit flows of the fluid therethrough between the pressure-receiving chamber 70 and the equilibrium chamber 72 owing to the fluid pressure difference between the pressure-receiving chamber 70 and the equilibrium chamber 72 relative to each other. Namely, flows of the fluid through the first orifice passages 74, 76 between the pressure-receiving chamber 70 and the equilibrium chamber 72 are made substantially equal to each other. Thus, the frequency range to which the first orifice passage 74, 76 are tuned is shifted to the higher frequency range so as to follow the increase of the frequency of the input vibration, in both cases where the fluid flows from the pressure-receiving chamber 70 to the equilibrium chamber 72, and in the reverse direction. Therefore, the engine mount 10 can exhibit a desired damping effect to higher frequency range of the input vibration than the initial frequency range of the first orifice passages 74, 76 based on resonance or flows of the fluid through the first orifice passages 74, 76.

In addition, the width dimension of the small width grooves 52b, 54b are made sufficiently small in order to provide a sufficiently large surface area of the elastic partition walls 58, 60 in which the fluid pressure is applied. This arrangement permits the elastic partition walls 58, 60 to be well responsive or sensitive to the fluid pressure applied thereto, while increasing a capacity of variation in the cross sectional areas of the first orifice passages 74, 76 owing to the elastic deformation of the respective elastic partition walls 58, 60. Thus, the engine mount 10 of the present embodiment is capable of exhibiting a desired vibration damping or isolating effect based on resonance of the fluid flowing through the first orifice passages 74, 76 over a wide frequency range.

Figure 7:
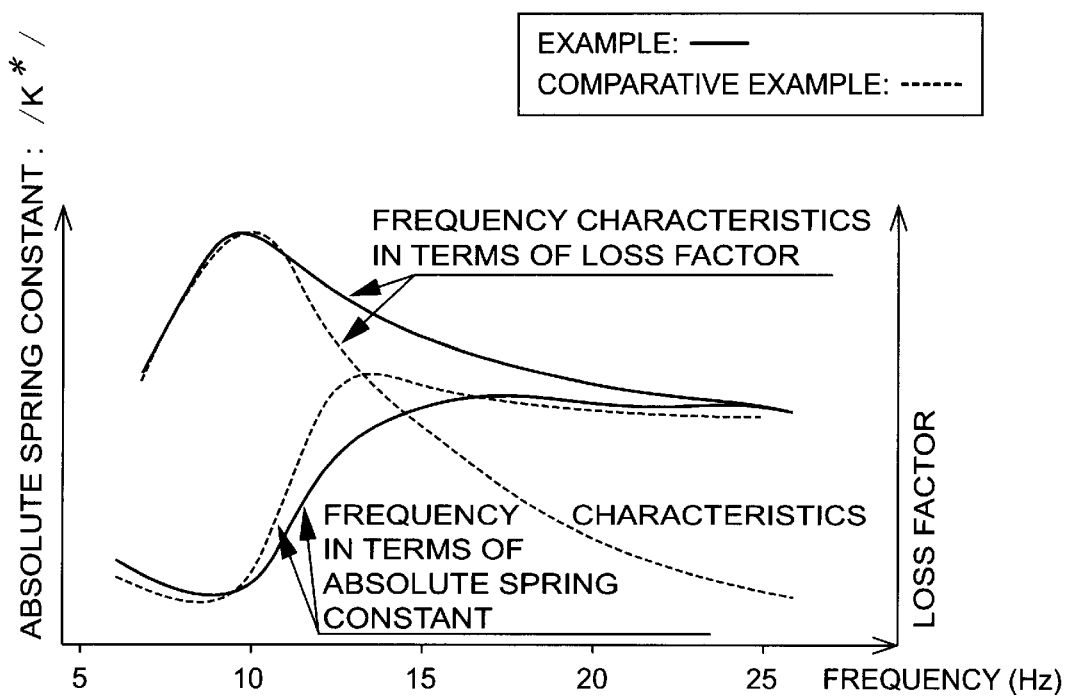
FIG. 7 is a graph showing frequency characteristics of damping effects measured in the engine mount of FIG. 1, together with those measured in an engine mount constructed according to a comparative example.
Figure 8:
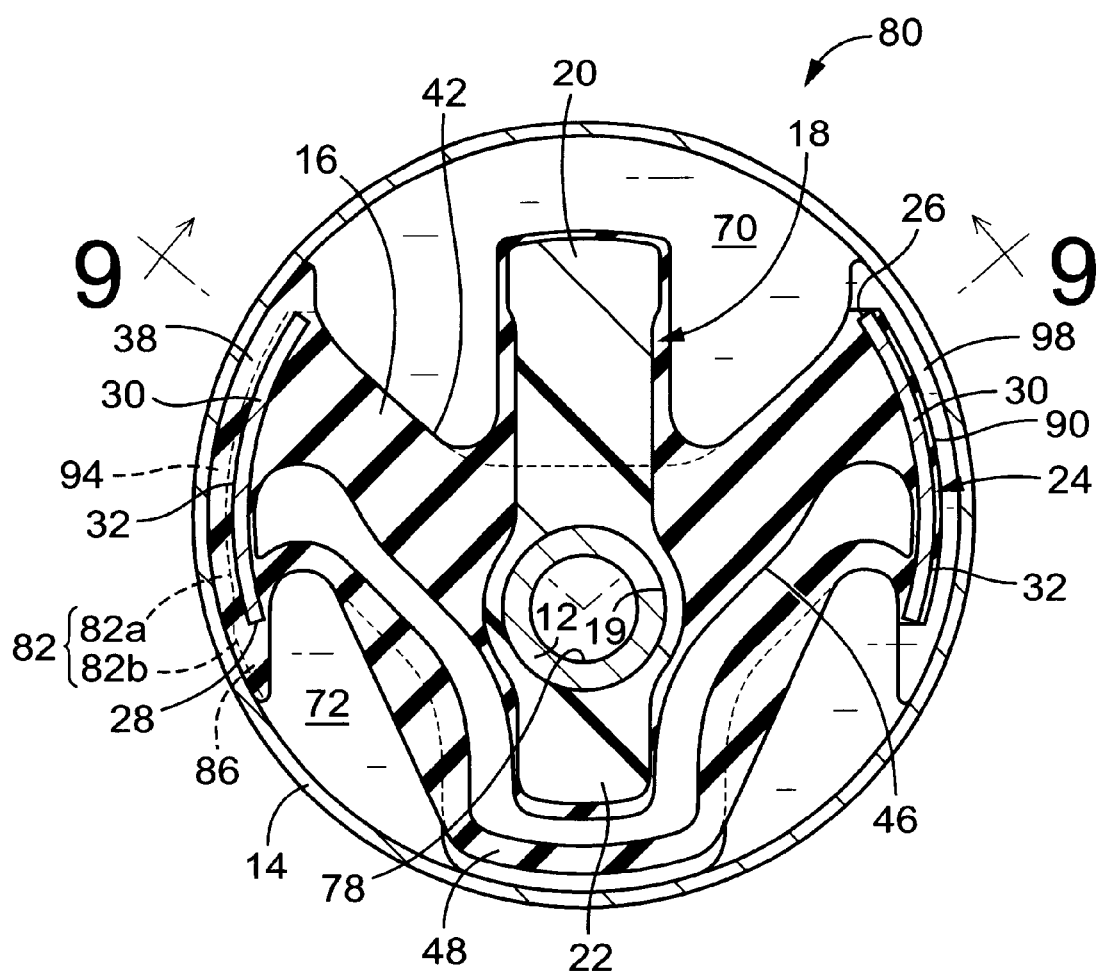
FIG. 8 is an elevational view in transverse cross section of a fluid-filled cylindrical vibration damping device in the form of an engine mount for use in an automotive vehicle, which is constructed according to a second embodiment of the invention.
Figure 9:
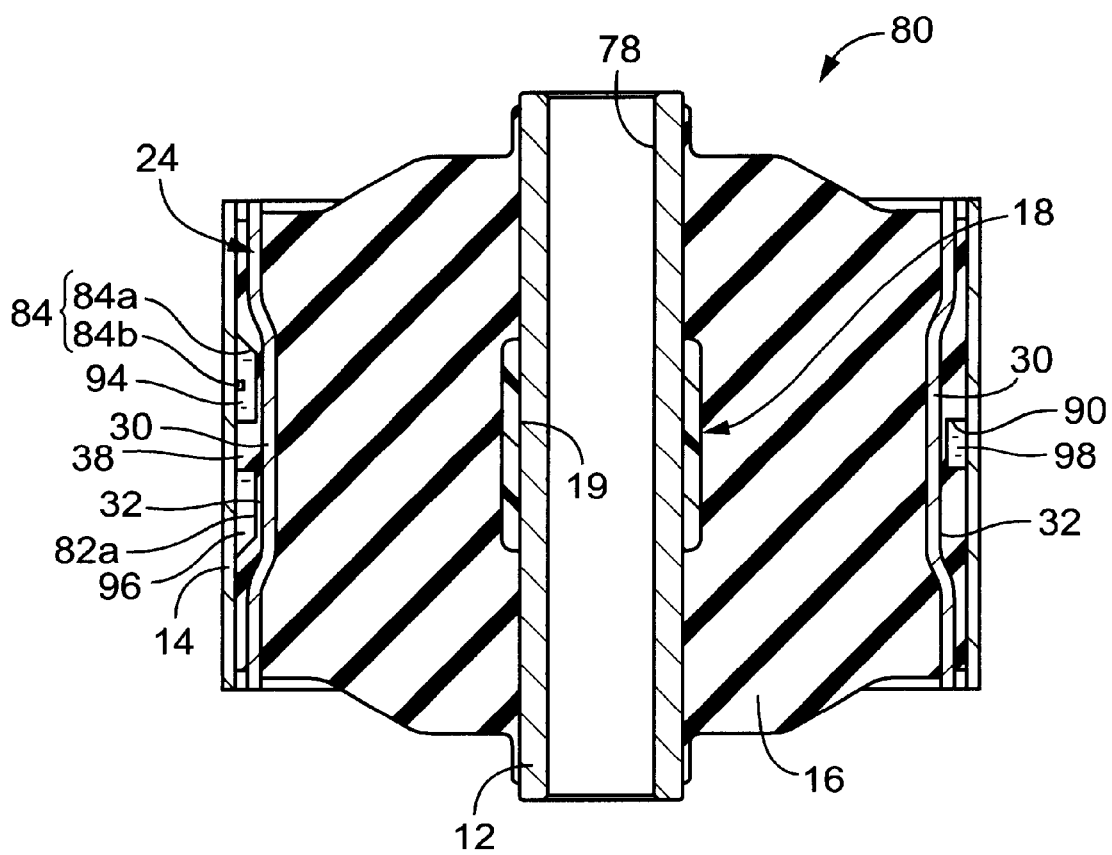
FIG. 9 is a cross sectional view taken along line 9—9 of FIG. 8.
Figure 10:
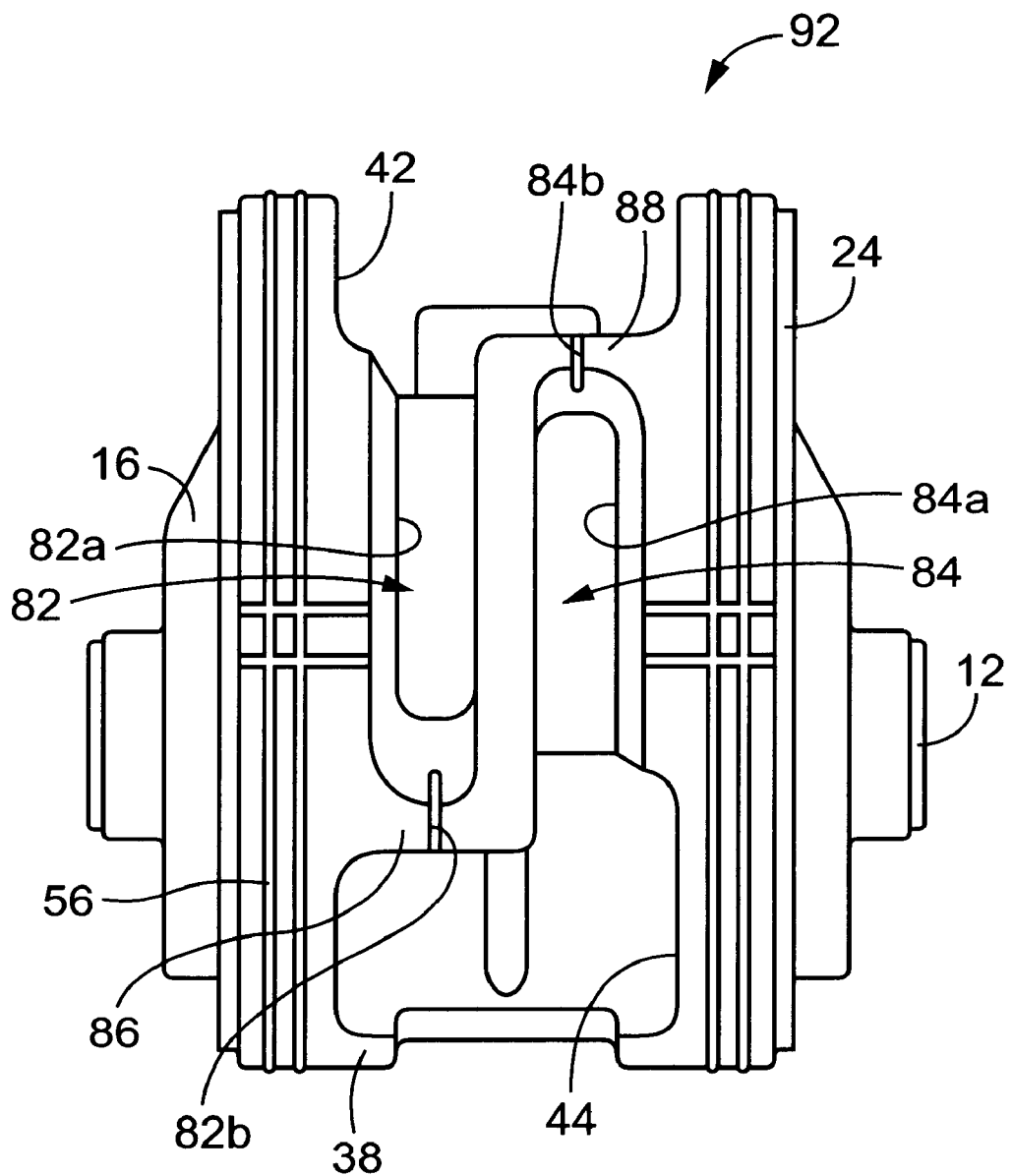
FIG. 10 is a left-side elevational view of an integrally vulcanized assembly of the engine mount of FIG. 8.
Figure 11:
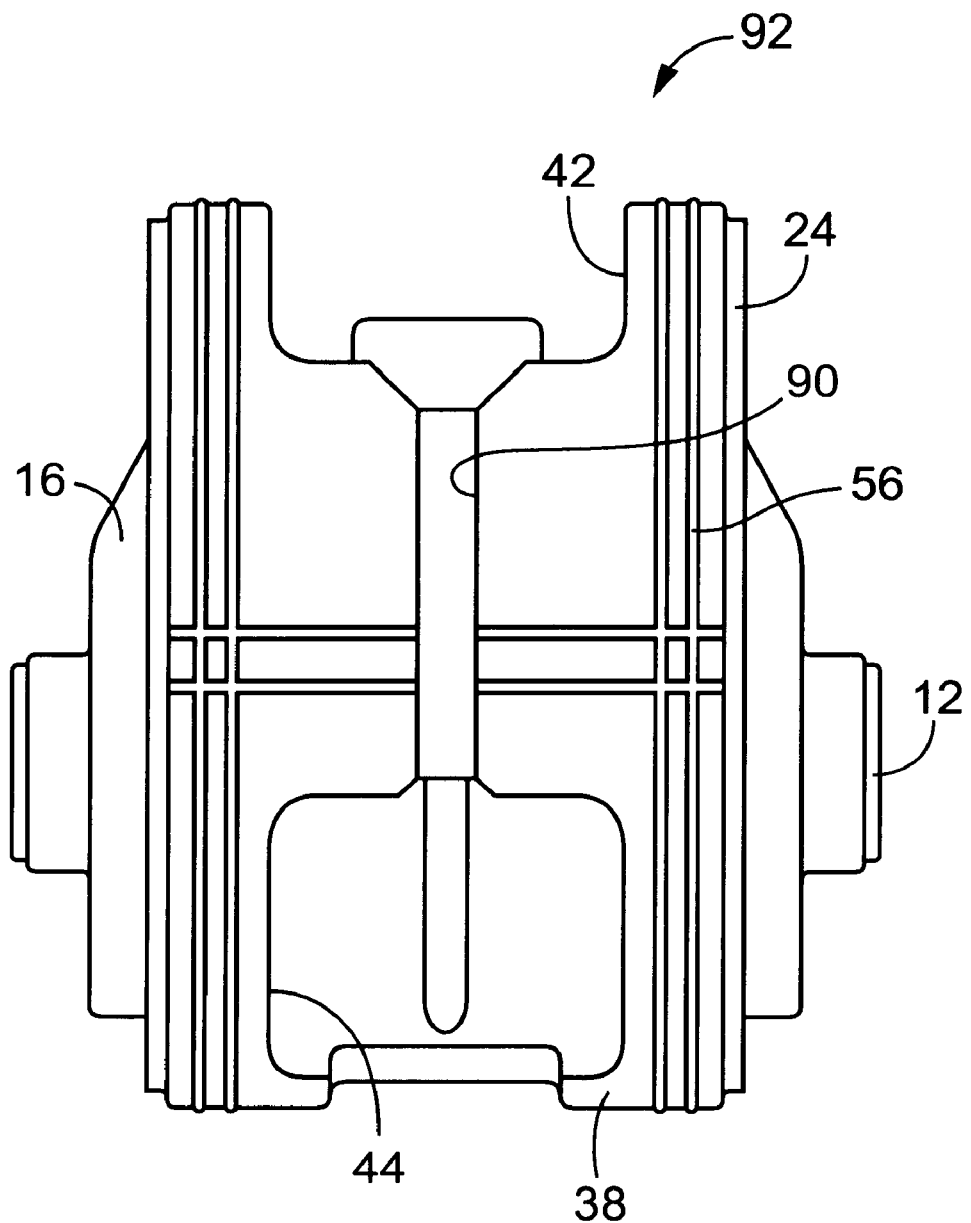
FIG. 11 is a right-side elevational view of the integrally vulcanized assembly of the engine mount of FIG. 8.

An example of the engine mount 10 of FIG. 1 was prepared and tested to measure frequency characteristics in terms of the absolute spring constant and loss factor (tan δ) when being subjected to vibrations applied thereto in the vertical direction as seen in FIG. 1. The measurements are indicated in the graph of FIG. 7. On the other hand, a comparative-example of an engine mount was prepared such that a pair of first orifice passages are provided with no elastic partition wall and extend with constant cross sectional areas over their entire lengths. The pair of first orifice passages were tuned to the initial or neutral tuning frequency of the first orifice passages of the example of the engine mount 10 of FIG. 1. The comparative example was also tested in the same manner. The result of the measurements is also indicated in the graph of FIG. 7.

As is understood from the graph of FIG. 7, the example of the engine mount of FIG. 1 can exhibit a relatively large damping force (i.e., a high loss factor) and a low dynamic spring constant or characteristics over a wide frequency range of 7 Hz–18 Hz. It should be noted that the example of the engine mount of FIG. 1 is still able to exhibit a sufficient vibration damping or isolating effect with respect to vibrations in a higher frequency range, which is higher than a frequency of a peak of the loss factor and a bottom of the dynamic spring constant. It should be appreciated that the example of the engine mount 10 can exhibit an excellent vibration damping or isolating effect with respect to vibrations over a comparatively wide frequency range. Conversely, the frequency range of the vibrations to which the comparative example of the engine mount can exhibit a desired damping effect, is significantly limited, i.e., limited to a frequency range of 7–12 Hz. It should be noted that the comparative example of the engine mount experiences abrupt deterioration of its damping characteristics when a frequency of input vibrations exceeds or is slightly larger than a frequency of the peak of the loss factor or the bottom of the dynamic spring constant.

There will be next described another preferred embodiment of a fluid-filled cylindrical vibration damping device of the present invention. In the following description, the same reference numerals as used in the first embodiment will be used for identifying structurally corresponding elements and portions, of which no detailed description will be provided.

Referring next to FIGS. 8–11, there is shown a fluid-filled cylindrical elastic mount in the form of an engine mount 80 constructed according to a second embodiment of the present invention. As is apparent from FIGS. 10 and 11 in which an integrally vulcanized assembly 92 is depicted, a pair of first grooves 82, 84 are formed in the circumferential groove 32 formed on one of the connecting parts 30, 30 of the intermediate sleeve 24, such that the first grooves 82, 84 extend circumferentially with a generally constant width over their entire length, while being parallel to each other. The width of each of the first grooves 82, 84 is dimensioned to be smaller than a half of the widthwise dimension of the circumferential groove 32. The first groove 82 corresponds to the first groove 52 of the first embodiment, while the first groove 84 corresponds to the first groove 54 of the first embodiment. Described in detail, the first grooves 82, 84 include large width grooves 82a, 84a and small width grooves 82b, 84b functioning as narrow grooves, respectively. Further, the first groove 82 includes an elastic partition wall 86 that is formed so as to protrude into the equilibrium chamber 72 with a given gradient, while the first groove 84 includes an elastic partition wall 88 that is formed so as to protrude into the pressure-receiving chamber 70 with a given gradient.

In the circumferential groove 32 formed on the other one of the connecting parts 30, 30 of the intermediate sleeve 24, on the other hand, there is formed a second groove 90 so as to extend straightly in the circumferential direction of the intermediate sleeve 24. The second groove 90 is located in a generally central portion of the circumferential groove 32 in the widthwise direction, and is dimensioned to have a widthwise length smaller than the large width grooves 82a, 84a and larger than the small width grooves 82b, 84b, while extending with a generally constant cross sectional shape over its entire length.

Like the first embodiment, the outer sleeve 14 is disposed radially outwardly on and press-fitted on the integrally vulcanized assembly 92 in which the first and second grooves 82, 84, 90 are formed as described above. The openings of these grooves 82, 84, 90 are fluid-tightly closed by the outer sleeve 14, thereby providing a pair of first orifice passages 94, 96 and a second orifice passage 98, each permitting a fluid communication between the pressure-receiving chamber 70 and the equilibrium chamber 72.

In the present embodiment, the pair of first orifice passages 94, 96 are substantially identical with the pair of the first orifice passages 74, 76 in construction, although the first orifice passages 94, 96 are tuned to a frequency range which is different from the frequency range to which the first orifice passages 74, 76 are tuned. Like the first embodiment, the engine mount 80 constructed according to the second embodiment is capable of preventing considerable deterioration of its vibration damping upon application of a vibrational load whose frequency is higher than the initial tuning frequency of the first orifice passages 94, 96, with the help of elastic deformation of the elastic partition walls 86, 88 according to the frequency of the input vibration and the resultant increase of the cross sectional area of the first orifice passages 94, 96 so as to shift the tuning frequency range of the first orifice passages 94, 96 to the higher frequency range.

On the other hand, the second orifice passage 98 whose cross sectional area is made constant over its length, is tuned to a frequency range which is higher than the initial tuning frequency of the first orifice passages 94, 96, and which is lower than a maximum tuning frequency of the first orifice passages 94, 96 that is generated by the largest elastic deformation of the elastic partition walls 86, 88.

The engine mount 80 constructed as described above can exhibit a high vibration damping or isolating effect with respect to vibrations over the above-described tuning frequency range of the second orifice passage 98 based on resonance or flows of the fluid through the second orifice passages 98. In particular, the second orifice passage 98 has no restricted or narrowed part, thus permitting a larger amount of fluid flow therethrough than that of the first orifice passages 94, 96. For this reason, the engine mount 80 can exhibit a more effective damping effect based on the resonance or flows of the fluid through the second orifice passage 98 than that of the first orifice passages 94, 96.

When the input vibration has a frequency higher than the tuning frequency of the second orifice passage 98, the elastic partition walls 86, 88 of the first orifice passages 94, 96 are elastically deformed for shifting the tuning frequency of the first orifice passages 94, 96 to a higher frequency range. This makes it possible to prevent or avoid that a resistance to flow of the fluid through the second orifice passage 98 is significantly increased, and a resultant considerable increase of the fluid pressure difference between the pressure-receiving chamber 70 and the equilibrium chamber 72. Therefore, the engine mount 80 of the second embodiment can exhibit a desired vibration damping or isolating effect with respect to vibrations over a wide frequency range.

Figure 12:
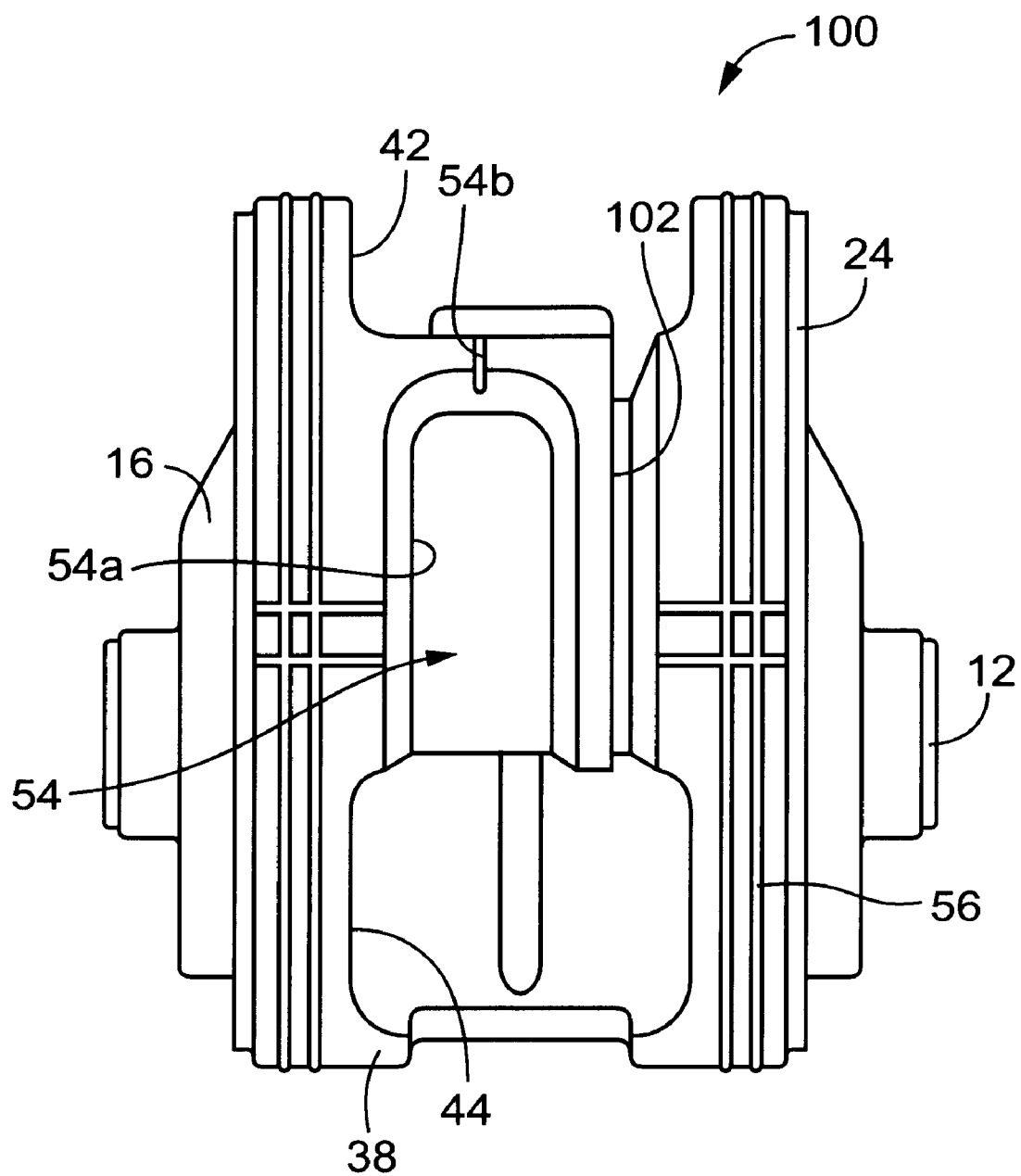
FIG. 12 is a right-side elevational view corresponding to FIG. 6, showing an integrally vulcanized assembly which is incorporated within a fluid-filled cylindrical vibration damping device in the form of an engine mount for use in an automotive vehicle, which is constructed according to a third embodiment of the invention.

Referring next to FIG. 12, there is shown an integrally vulcanized assembly 100 employed in an engine mount constructed according to a third embodiment of the present invention. Since the engine mount of the third embodiment is substantially identical with the first engine mount 10 in construction, except a configuration of a groove formed in one of the circumferential groove 32 of the connecting part 30 of the intermediate sleeve 24, no detailed illustration is provided for the other parts of the engine mount of the third embodiment.

According to the third embodiment of the present invention, the first groove 54 formed in the circumferential groove 32 of the one of the connecting parts 30, 30 is modified such that the widthwise dimension of the large width groove 54a is made smaller than that of the widthwise dimension of the large width groove 54a of the first embodiment, e.g., is held within a range of about one half (½) to three fourth (¾) of the widthwise dimension of the large width groove 54a according to the first embodiment. The large width groove 54a is also arranged to be formed on one of axially opposite sides of the circumferential groove 32. On the other side of the circumferential groove 32, a second groove 102 is formed so as to extend circumferentially between the first and second pockets 42, 44, and so as to be parallel to the first groove 52. Like the second groove 90 in the second embodiment, the second groove 102 has a substantially constant cross sectional area over its entire length.

Like the first and second embodiment, the outer sleeve 14 is disposed radially outwardly on and forcedly pressed onto the integrally vulcanized assembly 100, thereby providing the engine mount according to the third embodiment, in which a second orifice passage 98 is formed in a parallel relationship with the pair of first orifice passages 74, 76 between the pressure-receiving chamber 70 and the equilibrium chamber 72. Thus, the engine mount according to the third embodiment is capable of exhibiting an excellent vibration damping or isolating effect similar to the effect exhibited by the engine mount 80 of the second embodiment.

Figure 13:
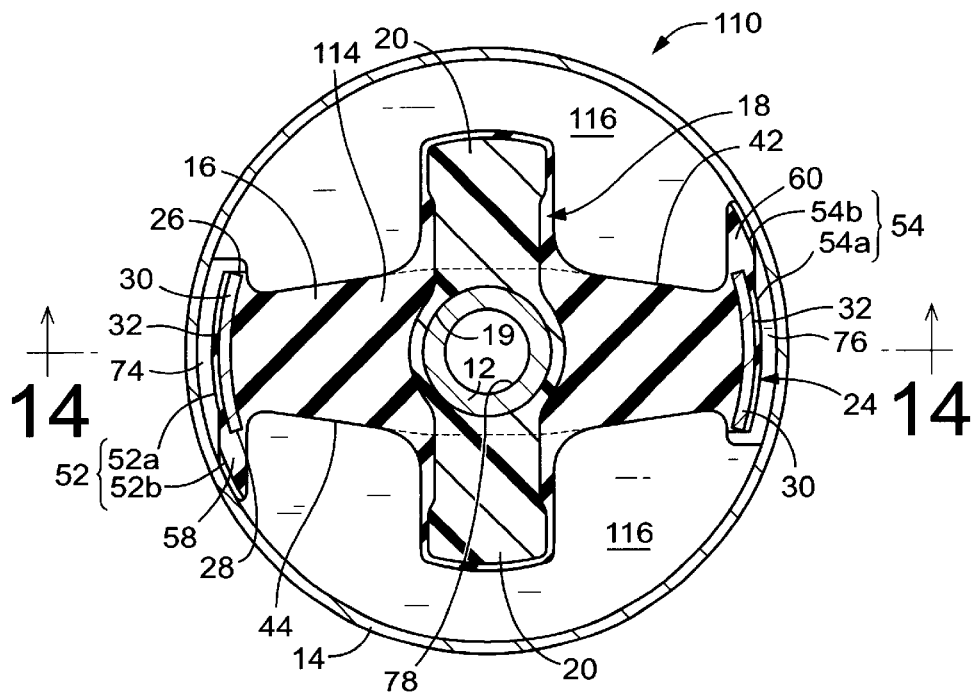
FIG. 13 is an elevational view in transverse cross section of a fluid-filled cylindrical vibration damping device in the form of a suspension bushing for use in an automotive vehicle, which is constructed according to a fourth embodiment of the invention.
Figure 14:
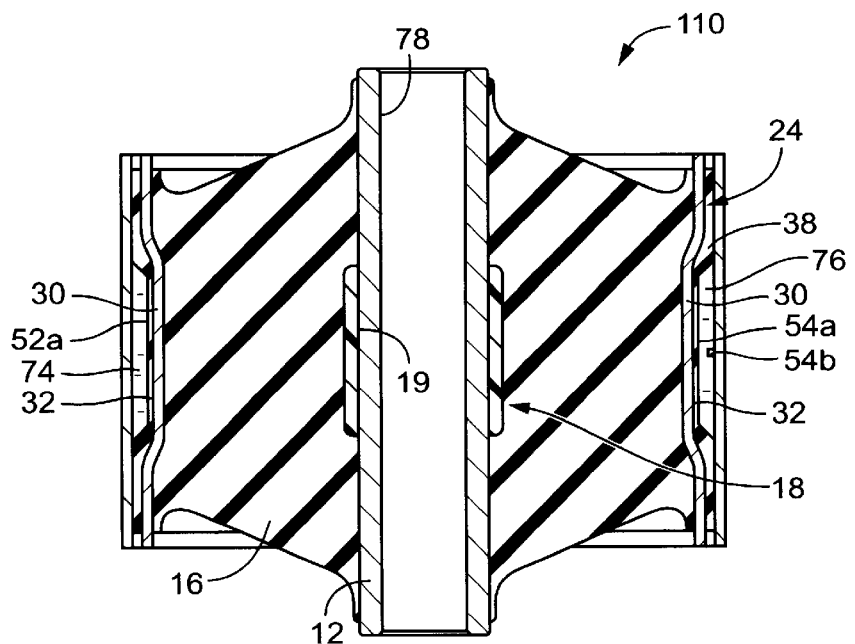
FIG. 14 is a cross sectional view taken along line 14—14 of FIG. 13.
Figure 15:
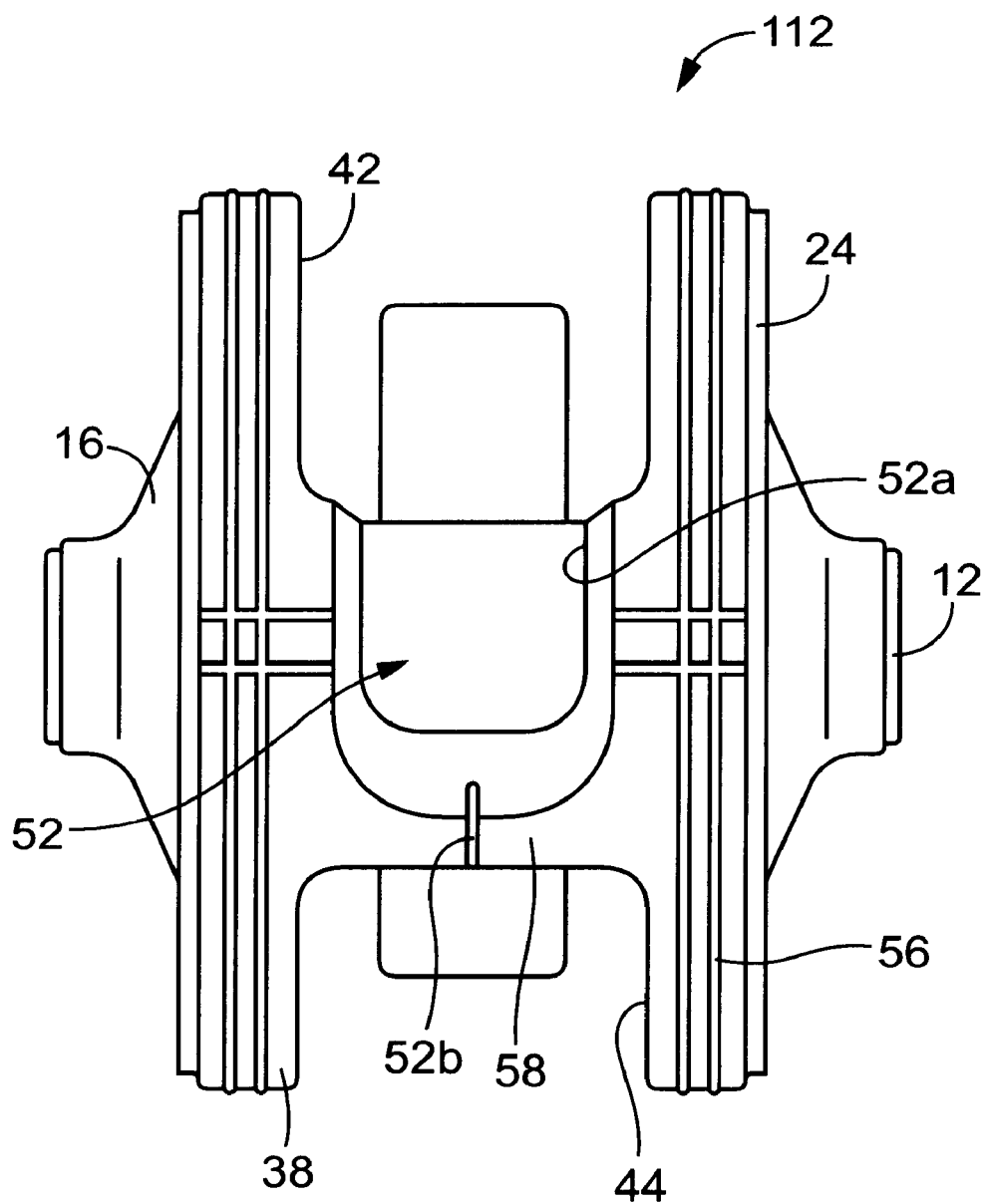
FIG. 15 is a left-side elevational view of an integrally vulcanized assembly of the suspension bushing of FIG. 13.
Figure 16:
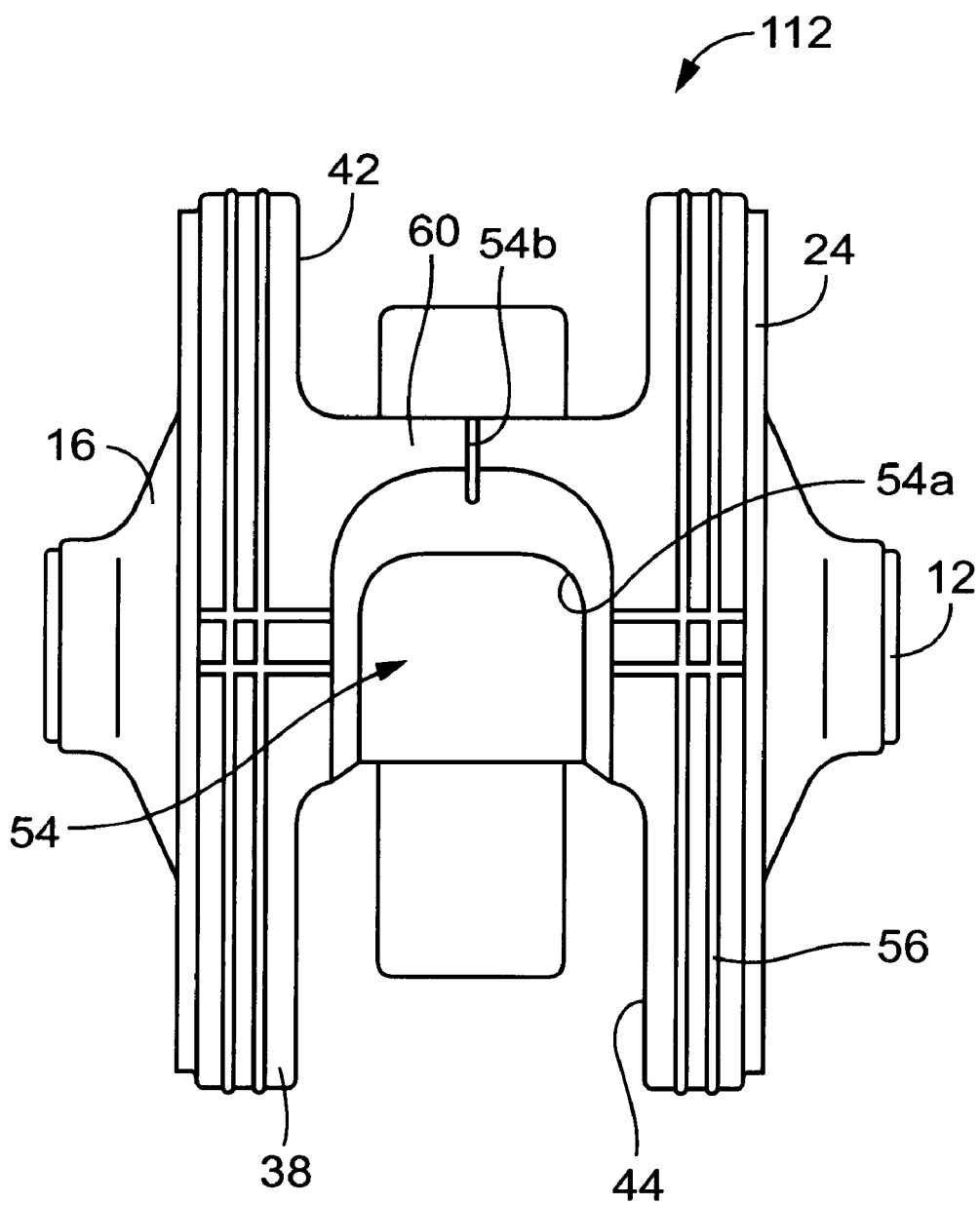
FIG. 16 is a right-side elevational view of the integrally vulcanized assembly of the suspension bushing of FIG. 13.

Referring next to FIGS. 13–14, there is shown a fluid-filled cylindrical vibration damping device in the form of a suspension bushing 110 constructed according to a fourth embodiment of the invention. FIGS. 15 and 16 show an integrally vulcanized assembly 112 of the suspension bushing 110 of the present embodiment. As is understood from FIGS. 15 and 16, the inner and outer sleeves 12, 14 are disposed in a generally concentric or coaxial relationship with each other in a state where no load acts between the inner and outer sleeves 12, 14. The first and second pockets 42, 44 opposed to each other in the vibrational load input direction (i.e , the vertical direction as seen in FIG. 1) with the inner sleeve 12 interposed therebetween, are arranged to have the generally same configurations. The bottoms of the both first and second pockets 42, 44 are integrally formed by a bottom rubber portion 114 which extends in a radial direction perpendicular to the vibrational load input direction. The stoppers 20 are formed on and protruding radially outwardly from the central portions of the bottoms of the first and second pockets 42, 44, respectively.

Like the first embodiment, the outer sleeve 14 is disposed radially outwardly on and forcedly pressed onto the integrally vulcanized assembly 112, thereby providing the fluid-filled cylindrical suspension bushing 110 in which a pair of fluid chambers 116, 116 are formed.

When a vibrational load is applied to the suspension bushing 110 in a direction in which the pair of fluid chambers 116, 116 are opposed to each other, a fluid pressure in one of the pair of fluid chambers 116, 116 is forced to vary relative to that in the other fluid chamber 116. Namely, a cycle of increase and decrease of the fluid pressure in the one fluid chamber 116 is made opposite to that of the other fluid chamber 116. Accordingly, the fluid is forced to flow through the first orifice passages 74, 76 due to the fluid pressure variation induced in the pair of fluid chambers 116, 116 as described above.

Like the first embodiment, the suspension bushing 110 constructed according to the present embodiment is capable of not only exhibiting an excellent vibration damping or isolating effect based on resonance of flows of the fluid through the first orifice passages 74, 76, but preventing the considerable deterioration of its vibration damping or isolating capability upon application of high frequency vibrations based on elastic deformation of the elastic partition walls 58, 60, also. Therefore, the suspension bushing 110 can exhibit an excellent vibration damping effect based on resonance or flows of the fluid through the first orifice passages 74, 76 over a wide frequency range of the vibrations to be damped.

While the presently preferred embodiments of this invention have been described above in detail for the illustrative purpose only, it is to be understood that the present invention is not limited to the details of the illustrated embodiments, but may be otherwise embodied.

For instance, the shape and structure of the elastic partition walls adapted to be elastically deformed due to the fluid pressure applied to the first orifice passage are not particularly limited to the illustrated embodiments, but may be suitably determined while taking into account vibration damping characteristics required for the fluid-filled cylindrical vibration damping device. For instance, the elastic partition walls may be formed in circumferentially intermediate portions of the first grooves 52, 54 so as to protrude radially outwardly from the bottom surfaces of the first grooves 52, 54 and so as to extend circumferentially with a given gradient, so that the elastic partition walls partially narrow or restrict the first orifice passages. Alternatively, the elastic partition walls may be divided into two parts and formed on the circumferentially opposite end portions of the first grooves 52, 54, respectively. In this arrangement, the elastic partition walls are free from the restriction by the intermediate sleeve 24 over a more wide area, further facilitating elastic deformation of the elastic partition walls.

While the two first orifice passages 74, 76, are used in the first embodiment, it may be possible to use only one of the first orifice passages 74, 76, preferably the first orifice passage 74, so that the elastic partition wall 58 is elastically deformed only when the fluid pressure in the pressure-receiving chamber 70 is higher than that in the equilibrium chamber 72. In this case, the engine mount 10 can also enjoy the same advantage of the present invention, namely, is capable of changing its vibration damping or isolating characteristics based on resonance or flows of the fluid through the first orifice passage 74 so as to follow the increase of the frequency of the input vibrations.

Further, the first and/or the second orifice passages may extend between the intermediate sleeve 24 and the outer sleeve 14 spirally or in a so-called "zigzag" form so as to obtain a sufficiently large length thereof. Alternatively, it may be possible to further employ an orifice member, to be disposed on the intermediate sleeve 24 so as to extend over the openings of the first and second pockets 42, 44. The outer sleeve 14 is disposed radially outwardly on the orifice member, thereby providing an orifice passage extending and defined between the orifice member and the outer sleeve member 14.

Furthermore, it may be possible to form two second pockets in the elastic body 16 such that the two second pockets are opposed to the first pockets 42 in the vibrational load receiving direction with the inner sleeve 12 interposed therebetween. These two second pockets are open in the outer circumferential surface of the intermediate sleeve 24 through two openings formed at respective portions of the intermediate sleeve 24, which are spaced apart from each other in the circumferential direction of the intermediate sleeve 24. The two openings of the intermediate sleeve 24 are fluid-tightly closed by the outer sleeve 14, thereby providing two equilibrium chambers independent to each other and spaced away from each other in the circumferential direction of the fluid-filled cylindrical vibration damping device. In this case, the two equilibrium chambers are held in fluid communication with the pressure-receiving chamber 70 through respective orifice passages that are tuned to different frequency ranges.

While the illustrated embodiments relate to the engine mount and the suspension bushing for use in automotive vehicles, the principle of the present invention is equally applicable to various other types of elastic mounts such as a body mount, a differential mount for use in automotive vehicles, and fluid-filled cylindrical vibration damping devices used for various devices other than those for automotive vehicles.

It is also to be understood that the present invention may be embodied with various other changes, modifications and improvements, which may occur to those skilled in the art, without departing from the spirit and scope of the invention defined in the following claims.

What is claimed is:

1. A fluid-filled cylindrical vibration damping device comprising:

an inner shaft member;

an outer sleeve member disposed radially outwardly of said inner shaft member in a spaced-apart relationship with said inner shaft member;

an elastic body interposed between said inner shaft member and said outer sleeve member for elastically connecting said inner shaft member and said outer sleeve member with each other;

a plurality of fluid chambers formed between said inner shaft member and said outer sleeve member and filled with a non-compressible fluid so that fluid pressures in said plurality of fluid chambers vary relative to each other upon application of a vibrational load to said vibration damping device; and a first orifice passage always permitting a fluid communication between said plurality of fluid chambers and being at least partially defined by an elastic member adapted to be subjected to shear deformation as a result of increase of a fluid pressure acting on said first orifice passage so that a cross sectional area of said first orifice passage increases according to an increase of said fluid pressure acting on said first orifice passage owing to said shear deformation of said elastic member.

2. A fluid-filled cylindrical vibration damping device according to claim 1, wherein said elastic member comprises an elastic protruding portion, which protrudes into an interior area of said first orifice passage so as to partially narrow said first orifice passage.

3. A fluid-filled cylindrical vibration damping device according to claim 2, wherein said elastic protruding portion protrudes into said interior area of said first orifice passage with a widthwise dimension over an entire width of said first orifice passage, and includes a narrow groove formed at an intermediate portion in a widthwise direction of a protruding end portion thereof so as to extend in a longitudinal direction of said first orifice passage, said elastic protruding portion being held at a protruding end surface of said protruding end portion thereof at opposite sides of said narrow groove in said widthwise direction with an inner surface of said first orifice passage.

4. A fluid-filled cylindrical vibration damping device according to claim 3, wherein said elastic protruding portion is inclined to one of opposite sides in said longitudinal direction of said first orifice passage so that said elastic protruding portion exhibits a soft spring characteristic with respect to said fluid pressure applied thereto from an other one of opposite sides in said longitudinal direction of said first orifice passage.

5. A fluid-filled cylindrical vibration damping device according to claim 4, wherein said vibration damping device includes a plurality of said first orifice passages that are arranged in parallel to each other and are respectively provided with said elastic protruding portions inclined to respective directions different from each other.

6. A fluid-filled cylindrical vibration damping device according to claim 4, wherein said elastic body includes a groove open in an outer circumferential surface thereof, whose opening is fluid-tightly closed by said outer sleeve member to thereby form said first orifice passage, and said elastic protruding portion is integrally formed with said elastic body such that said elastic protruding portion is formed at at least one of opposite open-end portions of said first orifice passage so as to protrude radially outwardly from a bottom of said groove while being inclined toward an outward of said one of opposite open-end portions of said first orifice passage.

7. A fluid-filled cylindrical vibration damping device according to claim 4, wherein said elastic body includes a groove open in an outer circumferential surface thereof, whose opening is fluid-tightly closed by said outer sleeve member to thereby form said first orifice passage, and said elastic protruding portion is integrally formed with said elastic body such that said elastic protruding portion is formed at a longitudinally intermediate portion of said groove so as to protrude radially outwardly from a bottom of said groove while extending toward one of longitudinally opposite sides of said groove inside said groove.

8. A fluid-filled cylindrical vibration damping device according to claim 6, further comprising an intermediate sleeve member disposed radially outwardly of said inner shaft member in a spaced-apart relationship with said inner shaft member, and elastically connected with said inner shaft member via said elastic body interposed therebetween upon vulcanization of a rubber material for forming said elastic body, while said outer sleeve member is press-fitted onto said intermediate sleeve member, said groove being open in an outer circumferential surface of said intermediate sleeve member.

9. A fluid-filled cylindrical vibration damping device according to claim 8, further comprising a sealing rubber layer bonded to said outer circumferential surface of the intermediate sleeve member for ensuring a fluid-tight sealing between said intermediate sleeve member and said outer sleeve member.

10. A fluid-filled cylindrical vibration damping device according to claim 9, wherein said sealing rubber layer is utilized to form said groove open in said outer circumferential surface of said intermediate sleeve member.

11. A fluid-filled cylindrical vibration damping device according to claim 1, further comprising a second orifice passage disposed in a parallel relationship with said first orifice passage, wherein said first and second orifice passages are relatively tuned such that said first orifice passage permits resonance of fluid flowing therethrough at a first frequency range lower than a resonance frequency range of fluid flowing through said second orifice passage when said first orifice passage is in a condition where said elastic member is not subjected to shear deformation, and permits resonance of said fluid flowing therethrough at a second frequency range higher than said resonance frequency range of said fluid flowing through said second orifice passage when said first orifice passage is in a condition where said elastic member is subjected to shear deformation.

12. A fluid-filled cylindrical vibration damping device according to claim 1, wherein said plurality of fluid chambers include a pressure-receiving chamber partially defined by said elastic body whose fluid pressure varies due to an elastic deformation of said elastic body, and an equilibrium chamber partially defined by a flexible layer whose volume is variable due to an elastic deformation of said flexible layer.

13. A fluid-filled cylindrical vibration damping device according to claim 1, wherein said plurality of said fluid chambers includes a plurality of pressure-receiving chambers partially defined by said elastic body and arranged in respective circumferential portions of said elastic body so as to be opposed to each other with said inner shaft member interposed therebetween in a direction in which a vibrational load is primarily applied to said vibration damping device.

* * * * *